(12) United States Patent
Wilson et al.

(10) Patent No.: US 6,477,773 B1
(45) Date of Patent: Nov. 12, 2002

(54) METHODS FOR DISASSEMBLING, REPLACING AND ASSEMBLING PARTS OF A STEAM COOLING SYSTEM FOR A GAS TURBINE

(75) Inventors: Ian D. Wilson, Mauldin, SC (US); Ronald R. Wesorick, Albany, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/489,672

(22) Filed: Jan. 24, 2000

Related U.S. Application Data

(63) Continuation-in-part of application No. 09/442,091, filed on Nov. 17, 1999, now abandoned.

(51) Int. Cl.$^7$ ................................................ B23P 15/00
(52) U.S. Cl. ..................................... 29/889.1; 29/889.2
(58) Field of Search ............................ 29/889.1, 889.2, 29/402.03, 402.04, 402.08

(56) References Cited

U.S. PATENT DOCUMENTS

| 5,318,404 A | 6/1994 | Carrero et al. |
|---|---|---|
| 5,593,274 A | 1/1997 | Carreno et al. |
| 6,158,102 A | * 12/2000 | Berry et al. ................ 29/281.5 |

OTHER PUBLICATIONS

"39$^{th}$GE Turbine State–of–the–Art Technology Seminar", Tab 1, "F"Technology –the First Half–Million Operating Hours, H.E. Miller, Aug. 1996.
"39th GE Turbine State–of–the–Art Technology Seminar", Tab 2, "GE Heavy–Duty Gas Turbine Performance Characteristics", F. J. Brooks, Aug. 1996.
"39th GE Turbine State–of–the–Art Technology Seminar", Tab 3, "9EC 50Hx 170–MW Class Gas Turbine", A. S. Arrao, Aug. 1996.
"39th GE Turbine State–of–the–Art Technology Seminar", Tab 4, "MWS6001FA –An Advanced–Technology 70–MW Class 50/60 Hz Gas Turbine", Ramachandran et al., Aug. 1996.
"39th GE Turbine State–of–the–Art Technology Seminar", Tab 5, "Turbomachinery Technology Advances at Nuovo Pignone", Benvenuti et al., Aug. 1996.
"39th GE Turbine State–of–the–Art Technology Seminar", Tab 6, "GE Aeroderivative Gas Turbines –Design and Operating Features", M.W. Horner, Aug. 1996.

(List continued on next page.)

Primary Examiner—I Cuda-Rosenbaum
(74) Attorney, Agent, or Firm—Nixon & Vanderhye

(57) ABSTRACT

The steam cooling circuit for a gas turbine includes a bore tube assembly supplying steam to circumferentially spaced radial tubes coupled to supply elbows for transitioning the radial steam flow in an axial direction along steam supply tubes adjacent the rim of the rotor. The supply tubes supply steam to circumferentially spaced manifold segments located on the aft side of the 1-2 spacer for supplying steam to the buckets of the first and second stages. Spent return steam from these buckets flows to a plurality of circumferentially spaced return manifold segments disposed on the forward face of the 1-2 spacer. Crossover tubes couple the steam supply from the steam supply manifold segments through the 1-2 spacer to the buckets of the first stage. Crossover tubes through the 1-2 spacer also return steam from the buckets of the second stage to the return manifold segments. Axially extending return tubes convey spent cooling steam from the return manifold segments to radial tubes via return elbows. The bore tube assembly, radial tubes, elbows, manifold segments and crossover tubes are removable from the turbine rotor and replaceable.

17 Claims, 25 Drawing Sheets

OTHER PUBLICATIONS

"39th GE Turbine State–of–the–Art Technology Seminar", Tab 7, "Advance Gas Turbine Materials and Coatings", P.W. Schilke, Aug. 1996.

"39th GE Turbine State–of–the–Art Technology Seminar", Tab 8, "Dry Low $NO_x$ Combustion Systems for GE Heavy–Duty Turbines", L. B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversion, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines, "J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25. "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunites for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program –Conceptual Design and Product Development", Annual Report, Sep. 1, 1994–Aug. 31, 1995.

"Advanced Turbine Systems (ATS Program) Conceptual Design and Product Development", Final Technical Progress Report, vol. 2 –Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993 –Aug. 31, 1994.

"Advanced Turbine Systems" Annual Program Review, Preprints, Nov. 2–4, 1998, Washington, D.C. U. S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at The GE Power Systems Gas Turbine Manufacturing Facility, Greenville, SC", Document #1753, Feb. 1998, Publication Date: Nov. 17, 1998, Report Numbers DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Test/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier"paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, No. 7–8, 1996, Washington, D.C., Publication Release.

"H Technology Commercialization", 1998 MarComm Activity Recommendation, Mar. 1998.

"H Technology", Jon Ebacher, VP, Power Gen Technology, May 8, 1998.

"H Testing Process", Jon Ebacher, VP Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H"Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$Century –"H" Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, pp. 3–13, Oct. 1995.

"Proceedings of the Advanced Turbine Systems Annual Program Review Meeting", vol. I, "H Gas Turbine Combined Cycle", J. Corman, pp. 14–21, Oct., 1995.

"Proceedings of the Advanced Turbine Systems Annual Program Review Meeting", vol. I, "Overview of Westinghouse's Advanced Turbine Systems Program", Bannister et al., pp. 22–30, Oct. 1995.

"Proceedings of the Advanced Turbine Systems Annual Program Review Meeting", vol. I, "Allison Engine ATS Program Technical Review", D. Mukaveta, pp. 31–42, Oct., 1995.

"Proceedings of the Advanced Turbine Systems Annual Program Review Meeting", vol. I, "Advanced Turbine Systems Program Industrial System Concept Developmen", S. Gates, pp. 43–63, Oct. 1995.

"Proceedings of the Advanced Turbine Systems Annual Program Review Meeting", vol. I, "Advanced Turbine System Program Phase 2 Cycle Selection", Latcovich, Jr., pp. 64–69 Oct., 1995.

"Proceedings of the Advanced Turbine Systems Annual Program Review Meeting", vol. I, "General Electric ATS Program Technical Review Phase 2 Activities", Chance et al., pp. 70–74, Oct., 1995.

"Proceedings of the Advanced Turbine Systems Annual Program Review Meeting", vol. I, "Technical Review of Westinghouse's Advanced Turbine Systems Program"Diakunchak et al., pp. 75–86, Oct., 1995.

"Proceedings of the Advanced Turbine Systems Annual Program Review Meeting", vol. I, "Advanced Combustion Turbines and Cycles: An EPRI Perspective", Touchton et al., pp. 87–88, Oct., 1995.

"Proceedings of the Advanced Turbine Systems Annual Program Review Meeting", vol. I, "Advanced Turbine Systems Annual Program Review", William E. Koop, pp. 89–92, Oct., 1995.

"Proceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/AGTSR Interactions", Sy A. Ali, pp. 103–106, Oct., 1995.

"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct., 1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinghouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al., pp. 233–248, Oct., 1995.

"Proceedings of the Advanced Turbine Systems Annual Program Review Meeting", vol. II, "Lean Premixed Flames for Low $No_x$Combustors", Sojka et al., pp. 249–275, Oct., 1995.

"Proceedings of the Advanced Turbine Systems Annual Program Review Meeting", vol. II, "Functionally Gradient Materials for Thermal Barrier Coating in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technolgies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally RIbbed Turbine Blade Coolant Channel with Cylindrical Vortex Generators", Hibbs et al, pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting", vol. II, The Role of Reactant Unmixedness, Strain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal System for Film Cooling Heat Transfer Measurement", M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 508–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp., 566–572, Oct., 1996.

"Proceedings of the Advanced Turbine Systems Annual Program Review Meeting", vol. II, "Improved Modeling Techniques for Turbomachinery Flow Field", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1998.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", Active Control of Combustion Instabilities in Low $NO_x$ Turbines, Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1998.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Genertors", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535,–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine–High Efficiency, Low Cost of Electricity and Low Emissions", Roger Schonewald and Patrick Marolda, (no date available),.

"Testing Program Results Validate GE's H Gas Turbine – High Efficiency, Low Cost of Electricity and Low Emissions", Slide Presentation –working draft, (no date available).

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1 –Dec. 31, 1996, Publication Date, Jun. 1, 1997, Report Numbers: DOE/MC/31176—5628,.

"Utility Advanced Turbine System (ATS) Technology Readiness Testing —Phase 3", Document #666274, Oct. 1, 1996–Sep. 30, 1997, Publication Date, Dec. 31, 1997, Report Numbers: DOE/MC/31176–10.

"Utility Advanced Turbine System (ATS) Technology Readiness Testing and Pre–Commercial Demonstration, Phase 3", Document #486029, Oct. 1 –Dec. 31, 1995, Publication Date, May 1, 1997, Report Numbers: DOE/MC/31176–5340.

"Utility Advanced Turbine System (ATS) Technology Readiness Testing and Pre–Commercial Demonstration–Phase 3", Document #486132, Apr. 1 –Jun. 30, 1976, Publication Date, Dec. 31, 1996, Report Numbers: DOE/MC/31176–5660.

"Utility Advanced Turbine System (ATS) Technology Readiness Testing and Pre–Commerical Demonstration —Phase 3", Document #587906, Jul. 1 –Sep. 30, 1995, Publication Date, Dec. 31, 1995, Report Numbers: DOE/MC/31176–5339.

"Utility Advanced Turbine System (ATS) Technology Readiness Testing and Pre–Commercial Demonstration" Document #666277, Apr. 1 –Jun. 30, 1997, Publication Date, Dec. 31, 1997, Report Numbers: DOE/MC/31176–8.

"Utility Advanced Turbine System (ATS) Technology Readiness Testing and Pre–Commercialization Demonstration" Jan. 1 –Mar. 31, 1996, DOE/MC/31176–5338.

"Utility Advanced Turbine System (ATS) Technology Readiness Testing: Phase 3R", Document #756552, Apr. 1 –Jun. 30, 1999, Publication Date, Sep. 1, 1999, Report Numbers: DE—FC21–95MC31176–23.

"Utility Advanced Turbine System (ATS) Technology Readiness Testing,", Document #656823, Jan. 1 –Mar. 31, 1998, Publication Date, Aug. 1, 1998, Report Numbers: DOE/MC/31176–17.

"Utility Advanced Turbine Systems (ATS) Technology Readiness Testing and Pre–Commercial Demonstration", Annual Technical Progress Report, Reporting Period: Jul. 1, 1995 –Sep. 30, 1996.

"Utility Advanced Turbine Systems (ATS) Technology Readiness Testing", Phase 3R, Annual Technical Progress Report, Reporting Period: Oct. 1, 1997 –Sep. 30, 1998.

"Utility Advanced Turbine Systems (ATS) Technology Readiness Testing", Document #750405, Oct. 1 –Dec. 30, 1998, Publication Date: May, 1, 1999, Report Numbers: DE–FC21–95MC31176–20.

"Utility Advanced Turbine Systems (ATS) Technology Readiness Testing", Document #1348, Apr. 1 –Jun. 29, 1998, Publication Date Oct. 29, 1998, Report Numbers DE–FC21–95MC31176–18.

"Utility Advanced Turbine Systems (ATS) Technology Readiness Testing –Phase 3", Annual Technical Progress Report, Reporting Period: Oct. 1, 1996 –Sep. 30, 1997.

"Utility Advanced Turbine Systems (ATS) Technology Readiness Testing and Pre–Commercial Demonstration", Quarterly Report, Jan. 1 –Mar. 31, 1997, Document #666275, Report Numbers: DOE/MC/31176–07.

"Proceedings of the 1997 Advanced Turbine Systems", Annual Program Review Meeting, Oct. 28–29, 1997.

* cited by examiner

Fig. 3

| Fig. 3A | Fig. 3B | Fig. 3C | Fig. 3D |

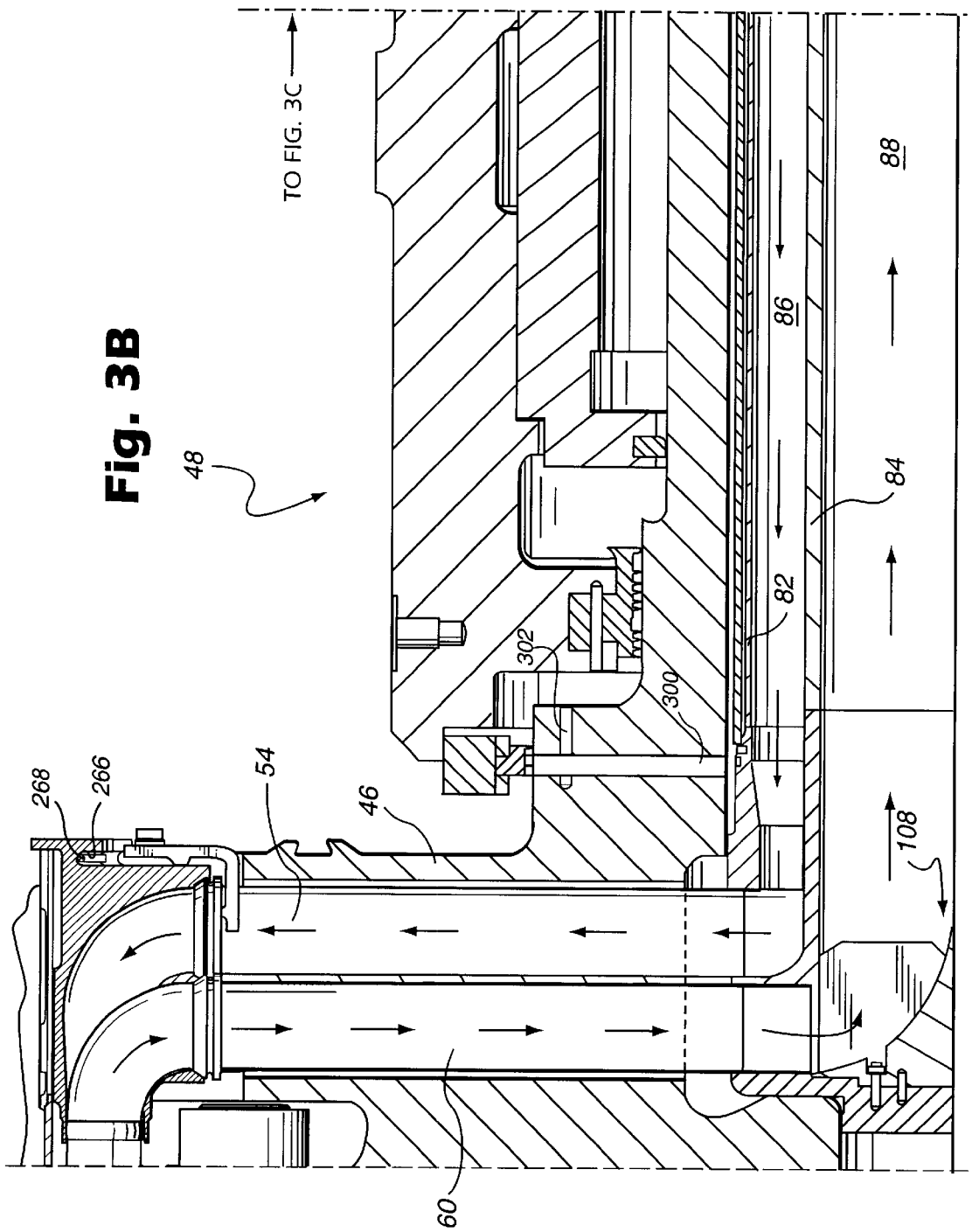

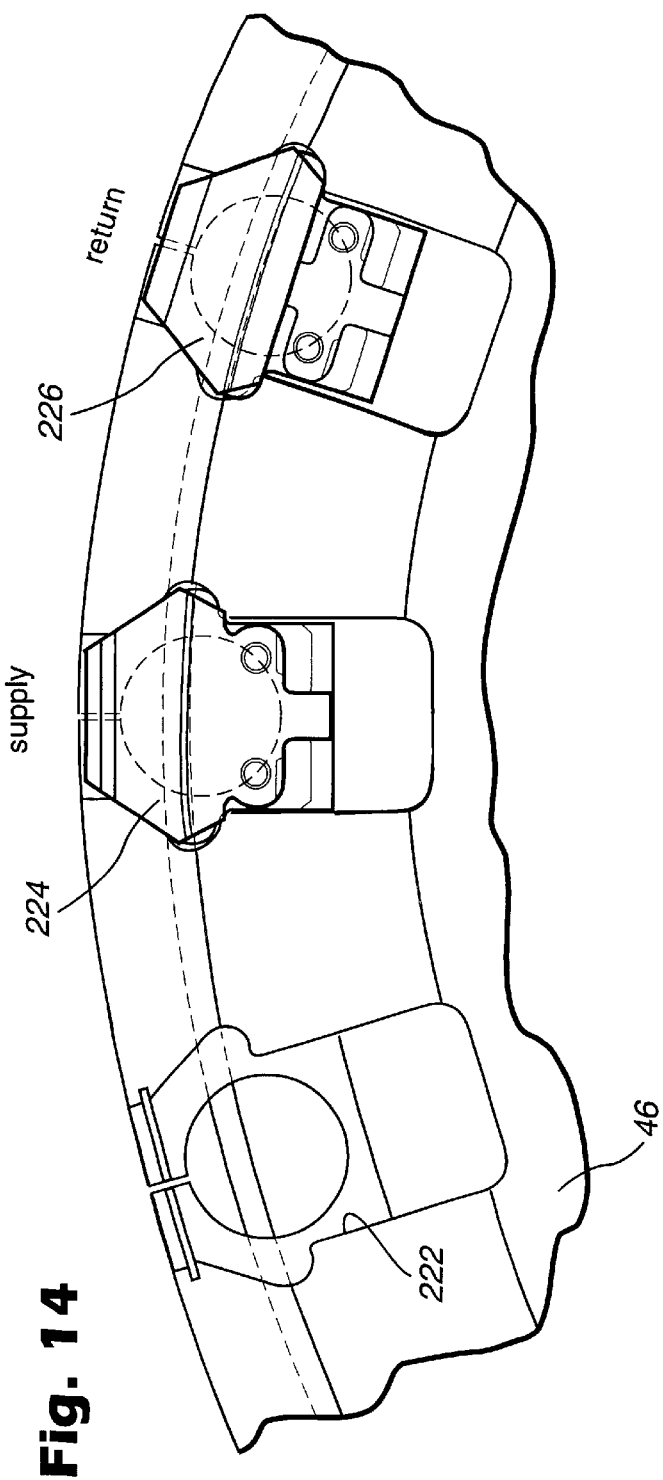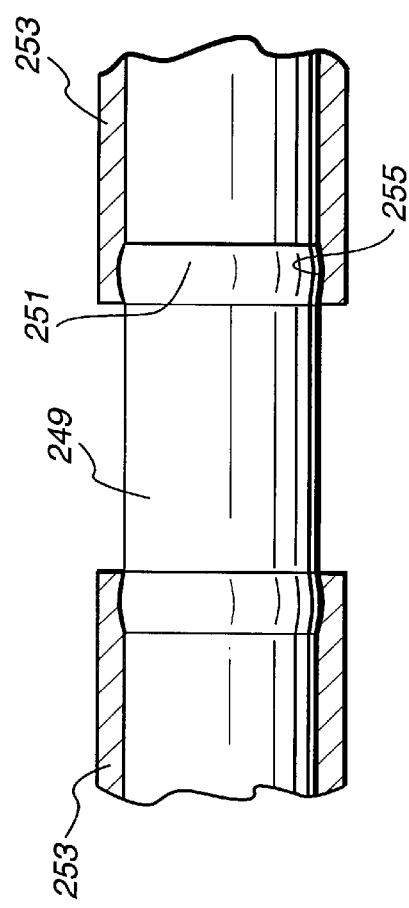
Fig. 14
Fig. 15

METHODS FOR DISASSEMBLING, REPLACING AND ASSEMBLING PARTS OF A STEAM COOLING SYSTEM FOR A GAS TURBINE

RELATED APPLICATIONS

This application is a continuation-in-part of application Ser. No. 09/442,091, filed Nov. 17, 1999, now abandoned the disclosure of which is incorporated herein by reference.

This invention was made with Government support under Contract No. DE-FC21-95MC31176 awarded by the Department of Energy. The Government has certain rights in this invention.

BACKGROUND OF THE INVENTION

The present invention relates generally to turbines and particularly to land-based gas turbines for power generation employing closed-circuit steam cooling paths for cooling the hot gas path components and returning the spent cooling steam to a return, for example, a heat recovery steam generator used in a combined cycle system. More particularly, the present invention relates to methods for disassembling, replacing and assembling parts of the steam cooling system of the gas turbine.

Steam cooling of hot gas path components, for example, the buckets of a gas turbine, has been proposed in the past and found efficacious in land-based power generating plants. While gas turbines are typically air-cooled, for example, jet engines employ compressor discharge air for cooling the hot gas components, steam cooling is more efficient in that the losses associated with the use of steam as a coolant are not as great as the losses realized by extracting compressor bleed air for cooling purposes. Also, in combined cycle operations, steam cooling is particularly advantageous because the heat energy imparted to the steam as it cools the gas turbine components is recovered as useful work in driving the steam turbine in the combined cycle operation.

In U.S. Pat. No. 5,593,274, of common assignee herewith, there is disclosed a gas turbine having coaxial steam passages for supplying cooling steam to hot gas components of the rotor, for example, the buckets, and returning the spent cooling steam to a return. Various refinements and improvements, however, in the supply and return of the steam for cooling purposes are provided by the present invention.

BRIEF SUMMARY OF THE INVENTION

The present invention provides methods for disassembling the component parts of the closed-circuit steam cooling system of a gas turbine rotor, replacing one or more parts of the disassembled steam cooling system with fresh or new parts and reinstalling the parts including the new parts into the turbine for purposes of refurbishing the cooling system. Before describing these methods, an understanding of the closed-circuit steam cooling system for the gas turbine is necessary. In general, the system includes a bore tube assembly for receiving cooling steam from a cooling inlet scroll for passage of steam generally along the axis of the gas turbine rotor. The supplied cooling steam is turned in a generally radial direction for flow through tubes in an aft shaft disk for conveying the cooling steam adjacent the rim of the rotor. The cooling steam is supplied axially along the rim of the rotor by a plurality of supply passages or tubes extending through openings in the stacked wheels and spacers forming the gas turbine rotor. Each supply passage or tube supplies cooling steam to a supply manifold segment, a plurality of which segments are circumferentially spaced one from the other about the rotor. Each supply manifold segment includes a plurality of exit ports and supply passageways for supplying cooling steam to each of first and second buckets of respective turbine wheels, preferably of the first and second stages of the gas turbine for cooling the buckets. Spent cooling steam is returned from the buckets via return passageways and inlet ports to a plurality of return manifold segments circumferentially spaced one from the other about the rim of the rotor. The return manifold segments are each connected to an axial return tube extending along the rim of the rotor to the aft shaft disk. The spent cooling steam flowing axially along the return tubes is supplied to radial tubes extending in the aft disk for return to the bore tube assembly and exit to a return, for example, a heat recovery steam generator of a combined cycle system.

Various aspects of the generally afore described cooling steam system are of particular significance. For example, the flow of the supply and return thermal medium changes between radial and axial directions at the rim of the rotor. Elbows of novel configuration and use are provided in radial opening slots in the aft disk in communication with the axial and radial tubes for changing the direction of flow. For example, elbows are provided interconnecting the radial supply tubes for turning the flow of the supply steam from radial directions into an axial direction in communication with the steam supply tubes along the rim of the rotor. Likewise, elbows interconnect the axial return tubes with the radial tubes for changing the direction of flow of the spent cooling medium from an axial direction to radial directions. The elbows are preferably integrally cast parts readily assembled into the slots of the aft disk.

The cooling steam supply and spent cooling steam return manifolds are manifested in circumferentially spaced manifold segments. The supply and return manifold segments are also axially spaced from one another. Each manifold lies in communication with the buckets of a pair of adjacent wheels. For example, each supply manifold segment lies in communication with certain buckets of adjacent wheels on opposite axial sides thereof. Likewise, the return manifold segments receive spent cooling steam from certain buckets which also lie on opposite sides of the return manifold segments. Spoolies are used to interconnect the supply and return manifold segments with the various passages in the buckets.

It will be appreciated that the above-described cooling system is formed of various component parts which are susceptible to degradation by the flow of steam and that, as a result, such parts may fail over time. It is therefore desirable to refurbish the steam cooling system of the turbine, preferably at scheduled outages, by replacing parts thereof which have degraded or which should be replaced on a scheduled maintenance basis. As a consequence, it is necessary to have access to the various parts of the steam cooling system within the turbine rotor in order to replace such parts. The present invention permits the disassembly and removal of the various parts of the steam cooling system and the installation of replacement parts in lieu thereof.

To accomplish the foregoing, the supply and radial tubes of the aft disk and the supply and return axial tubes extending through the rim of the rotor may be removed by first removing the elbows on the aft disk which turn the flow between radial and axial directions. The elbows are mounted in dovetail grooves on the aft disk for removal in an axially aft direction. The elbows support the radial tubes in their outermost radial positions by spring clips interconnecting the elbows and radial tubes. By removing the spring clips and a retention ring for the elbows, the elbows are displaced in an axially aft direction which frees the radial tubes for removal in a radially outward direction from the aft disk.

When the elbows are removed, retention plates which secure the axially extending supply and return tubes against axial movement in an aft direction are displaced in a circumferential direction followed by radial movement. This frees the axial tubes for removal from the wheels and spacers of the rotor in an axially aft direction. Upon withdrawal of the axial tubes, the spoolies interconnecting the axial tubes and the manifolds are withdrawn therewith or may be withdrawn separately through the aligned openings of the wheels and spacers.

By removing the buckets of adjacent wheels, the crossover tubes between the supply and return manifolds and the buckets are exposed for axial withdrawal. After removal of the crossover tubes, the manifold segments are disconnected from the spacer by a radial inward movement followed by an axial movement and a radial outward movement.

The bore tube assembly is likewise removed from the rotor. Radially extending pins are first disconnected from the aft disk thereby releasing the end cap assembly from the aft disk. The bore tube assembly can then be axially withdrawn in an aft direction from the rotor.

It will be appreciated that with all of the various parts of the cooling system withdrawn from the rotor, the parts can be inspected and replaced as needed or on a scheduled basis. The reverse procedure is employed to reinstall the parts of the cooling system as explained in detail below.

In a preferred embodiment according to the present invention, there is provided in a turbine rotor having axially spaced wheels mounting buckets, and spacers between the wheels, and a closed circuit cooling system for cooling the buckets, comprised of a plurality of parts for flowing a cooling medium, the parts including a plurality of tubes disposed within the rotor defining flow passages for flowing the cooling medium to and from the buckets, a method of repairing one or more of the parts of the cooling system, comprising the steps of removing at least one of the tubes from the rotor and installing in the rotor the one tube repaired or a replacement part for the one tube.

In a further preferred embodiment according to the present invention, there is provided in a turbine rotor having axially spaced wheels mounting buckets, and spacers between the wheels, a cooling system for cooling the buckets, comprised of a plurality of parts for flowing a cooling medium, the parts including a plurality of generally axially extending tubes circumferentially spaced from one another about the rotor defining flow passages for flowing the cooling medium, a plurality of generally radially extending tubes defining flow passages for flowing the cooling medium, and an aft disk forming part of the rotor and having a plurality of flow turning elements interconnecting the axial and radially extending tubes, the flow turning elements having passageways for communicating and turning the cooling medium between the flow passages of the axial and radial tubes, a method of disassembling at least a portion of the cooling system, comprising the steps of removing the flow turning elements from the aft disk, removing the radial tubes from the aft disk in a radial outward direction and removing the axial tubes in a generally aft direction.

In a still further preferred embodiment according to the present invention, there is provided in a turbine rotor having axially spaced wheels mounting buckets, and spacers between the wheels, and a closed circuit cooling system for cooling the buckets, comprised of a plurality of parts for flowing a cooling medium within the rotor to and from the buckets, a method of repairing one or more of the parts of the cooling system, comprising the steps of removing at least one of the cooling system parts from the rotor and installing in the rotor the one cooling system part repaired or a replacement part for the one cooling system part.

BRIEF DESCRIPTION OF THE DRAWINGS

FIG. 3 is a block diagram illustrating the relationship of FIGS. 3A, 3B, 3C and 3D;

FIG. 3B is an enlarged cross-sectional view of an aft portion of the rotor adjacent its rim illustrating the radial supply and return tubes and their communication with a bore tube assembly;

FIG. 14 is a fragmentary elevational view looking in a forward direction at the aft disk;

FIG. 15 is a fragmentary elevational view of a representative spoolie having spherical end portions engaged in spherical seats of adjoining parts illustrated in cross-section;

DETAILED DESCRIPTION OF THE INVENTION

Figure 1:
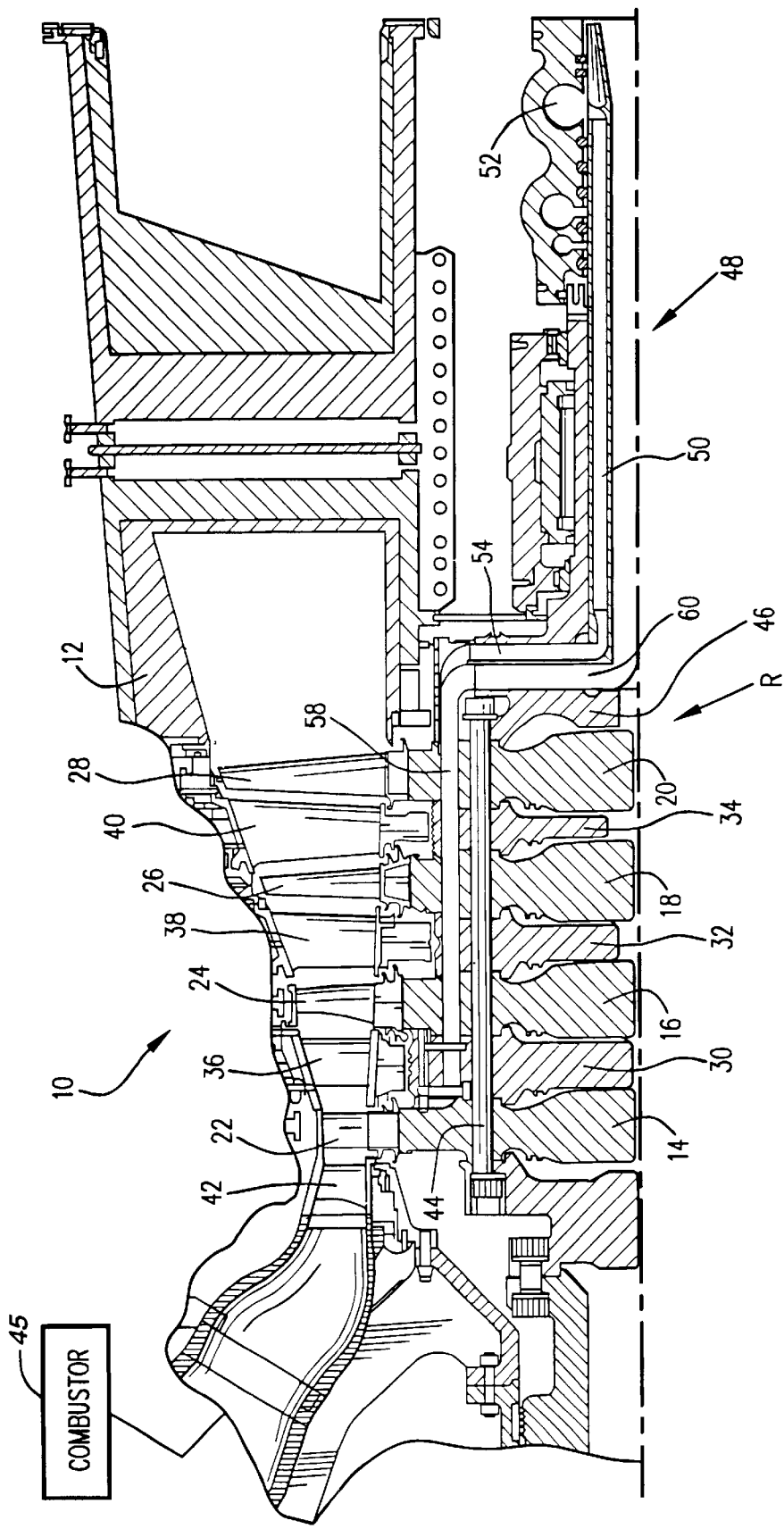
FIG. 1 is a cross-sectional view of a portion of a gas turbine illustrating a turbine section thereof incorporating portions of a cooling system according to a preferred embodiment of the present invention.

Referring to FIG. 1, there is illustrated a turbine section, generally designated 10, incorporating a preferred embodiment of the present invention. The turbine section 10 includes a turbine housing 12 surrounding a turbine rotor R. Rotor R includes in the present example four successive stages comprising wheels 14, 16, 18 and 20, carrying a plurality of circumferentially spaced buckets or blades 22, 24, 26 and 28, respectively. The wheels are arranged alternately between spacers 30, 32 and 34. The outer rims of spacers 30, 32 and 34 lie in radial registration with a plurality of stator blades or nozzles 36, 38 and 40, with the first set of nozzles 42 lying forwardly of the first buckets 22. Consequently, it will be appreciated that a four-stage turbine is illustrated wherein the first stage comprises nozzles 42 and buckets 22; the second stage, nozzles 36 and buckets 24; the third stage, nozzles 38 and buckets 26 and, finally, the fourth stage, nozzles 40 and buckets 28. The rotor wheels and spacers are secured one to the other by a plurality of circumferentially spaced bolts 44 passing through aligned openings in the wheels and spacers. A plurality of combustors, one being schematically illustrated at 45, are arranged about the turbine section to provide hot gases of combustion through the hot gas path of the turbine section comprising the nozzles and buckets for rotating the rotor. The rotor also includes an aft disk 46 formed integrally with a bore tube assembly, generally designated 48 defining an aft shaft.

Figure 2:
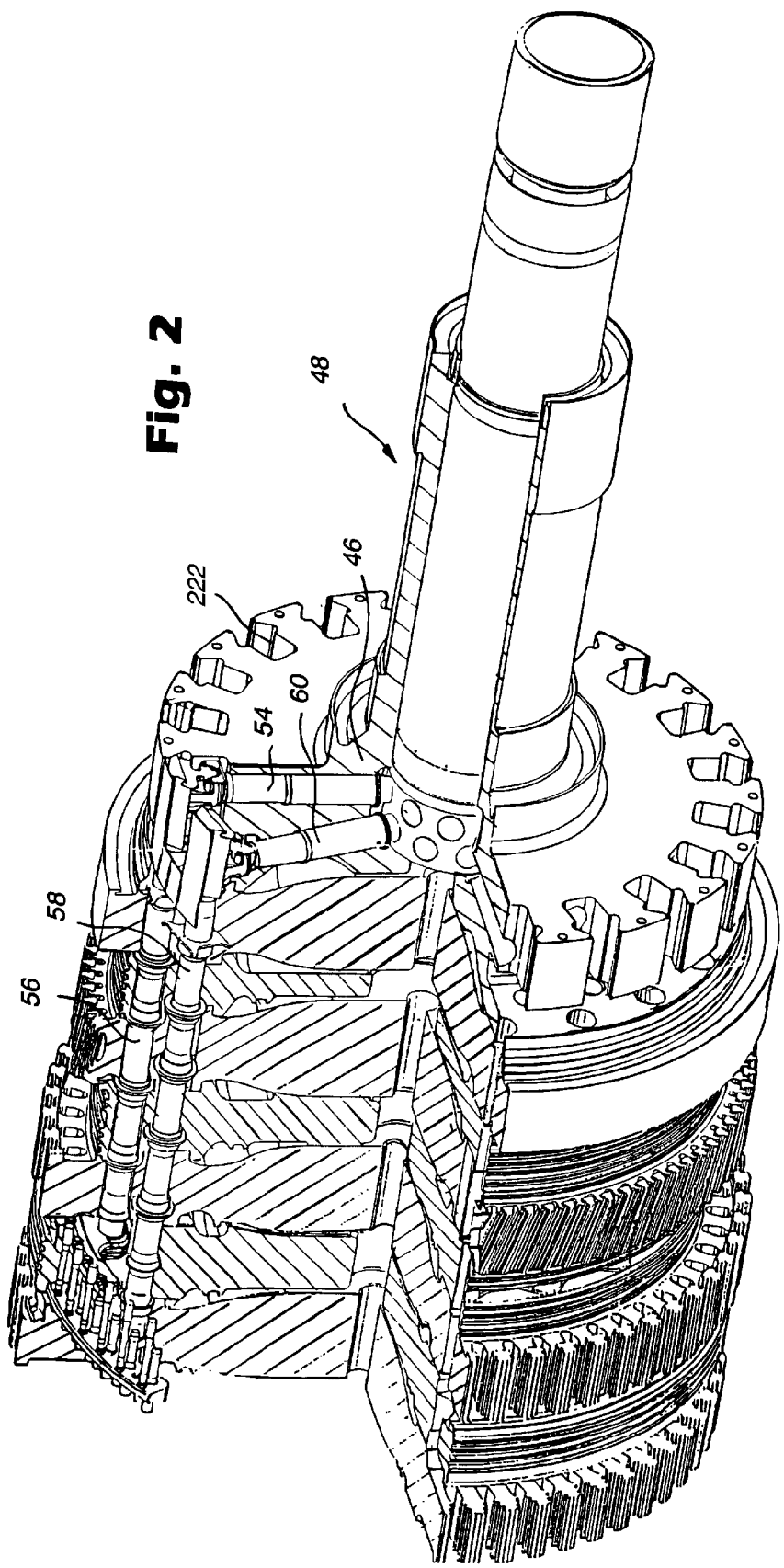
FIG. 2 is a fragmentary perspective view of portions of a turbine rotor with parts broken out and in cross-section for ease of illustration.

At least one and preferably both sets of buckets 22 and 24 preferably of the first two stages are provided with a thermal medium for cooling, the thermal medium preferably being cooling steam. Cooling steam is supplied and returned through the bore tube assembly 48. With reference to FIGS. 1 and 2 and in a preferred embodiment, the bore tube assembly 48 includes an annular passage 50 supplied with cooling steam, from a steam supply, e.g., plenum 52, for flow to a plurality of radially extending tubes 54 provided in the aft disk 46. Tubes 54 communicate with circumferentially spaced, axially extending thermal medium supply tubes 56 in communication with cooling passages in the first and second-stage buckets. Spent or returned cooling steam at an elevated temperature flows from the first and second-stage buckets through a plurality of circumferentially spaced, axially extending return tubes 58. Return tubes 58 communicate at their aft ends with radially inwardly extending return tubes 60 in aft disk 46. From tubes 60, the spent steam flows into the central bore 88 of the bore tube assembly 48 for return to a supply or for flow to a heat recovery steam generator for use in a combined-cycle system.

Figure 3A:
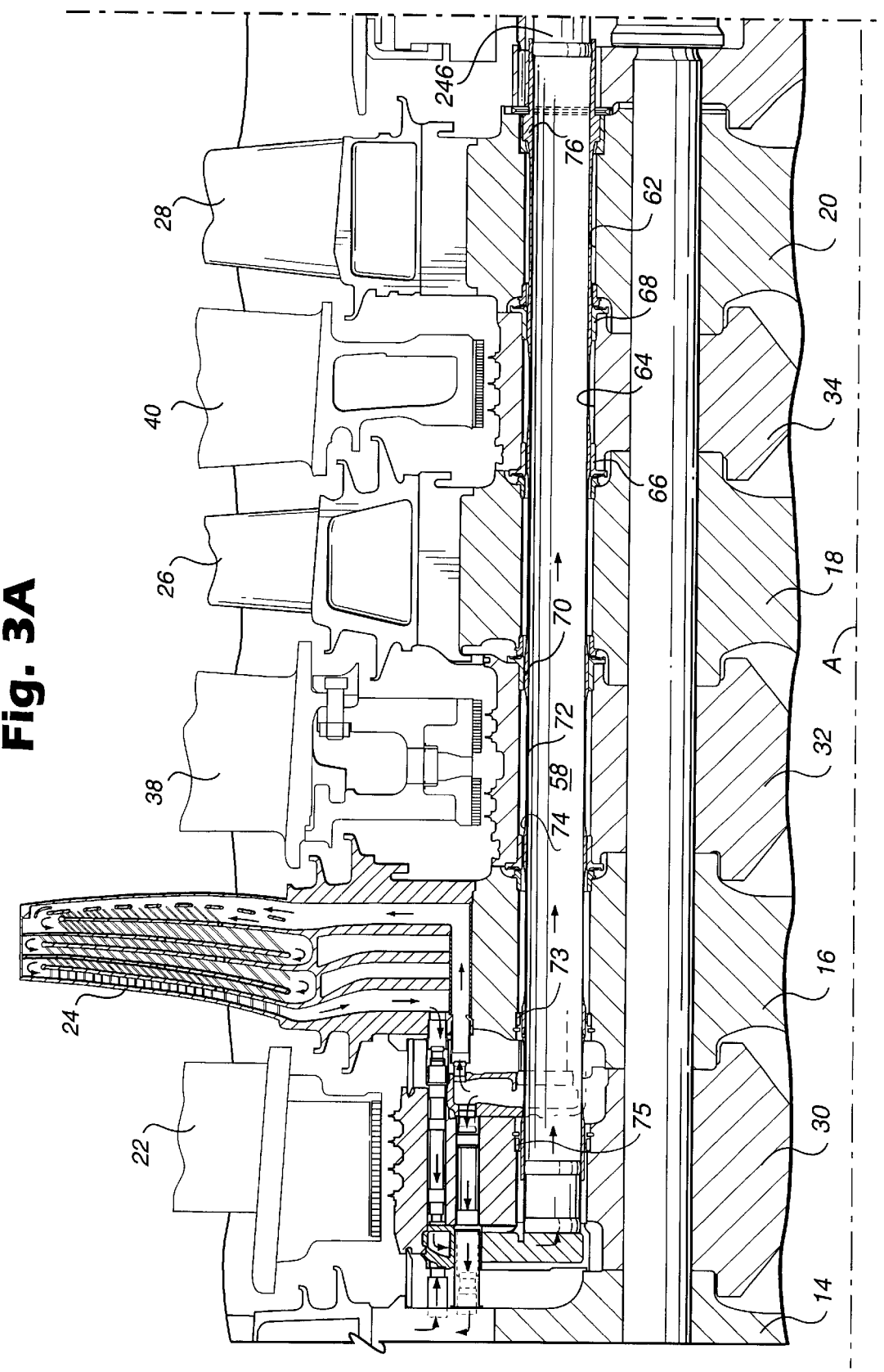
FIG. 3A is a fragmentary cross-sectional view illustrating a rim of the rotor with the thermal medium return tube being illustrated.

It will be appreciated from the foregoing description that the axially extending supply and return tubes 56 and 58, respectively, lie adjacent the rim of and circumferentially about the rotor, with each supply and return tube extending through axially aligned openings through the axially stacked wheels and spacers. For example, the aligned openings 62 and 64 of wheel 20 and spacer 34, respectively, of the fourth stage are illustrated in FIG. 3A. Similar aligned openings are provided in the wheels and spacers of the first, second and third stages.

As illustrated in FIG. 3A, bushings are provided at various locations within the openings of the wheels and spacers for supporting the cooling medium supply and return tubes 56 and 58, respectively. For example, bushings 66 and 68 are disposed adjacent opposite ends of the opening 64 through spacer 34. Similar bushings are disposed at opposite ends of the third-stage spacer 32. Bushings 73 and 75 are provided at the forward opening of wheel 16 and the aft opening of spacer 30, respectively. Similar bushings are provided in the aligned openings for the supply tube.

Referring to FIG. 3A, a return tube 58 is specifically illustrated. It will be appreciated, however, that the supply and return tubes spaced about the rim of the rotor are similar in aspects relevant to this invention and a description of one will suffice as a description of the other, except as otherwise noted. Moreover, the supply and return tubes 56 and 58 having centers at equal radii from the rotor axis A (FIG. 3A) and are equally spaced circumferentially from one another. Each tube comprises a thin-walled structure having a plurality of raised lands 70 at axially spaced locations along the length of the tube. The axial locations of the lands 70 coincide with locations of the bushings in the openings through the wheels and spacers. Between the lands 70 are thin-walled tube sections 72. It will be appreciated that the outer exterior surfaces of the lands 70 are radially outwardly of the exterior surfaces of the thin-walled sections 72. Transition sections 74 are provided between each land 70 and adjacent thin-walled sections 72. Transition sections have arcuate outer surfaces transitioning radially inwardly from the outer surface of the lands to the outer surfaces of the thin-walled sections. An enlarged land or flange 76 is provided adjacent aft portions of each tube. For a more detailed description of the supply and return tubes, the manner of their retention within the rotor and seals therefor, reference is made to U.S. patent applications Ser. Nos. 09/334,187; 09/304,202; and 09/332,330, filed Jun. 16, 1999; May 3, 1999 and Jun. 14, 1999, respectively the disclosures of which are incorporated hereinby reference).

Figure 3C:
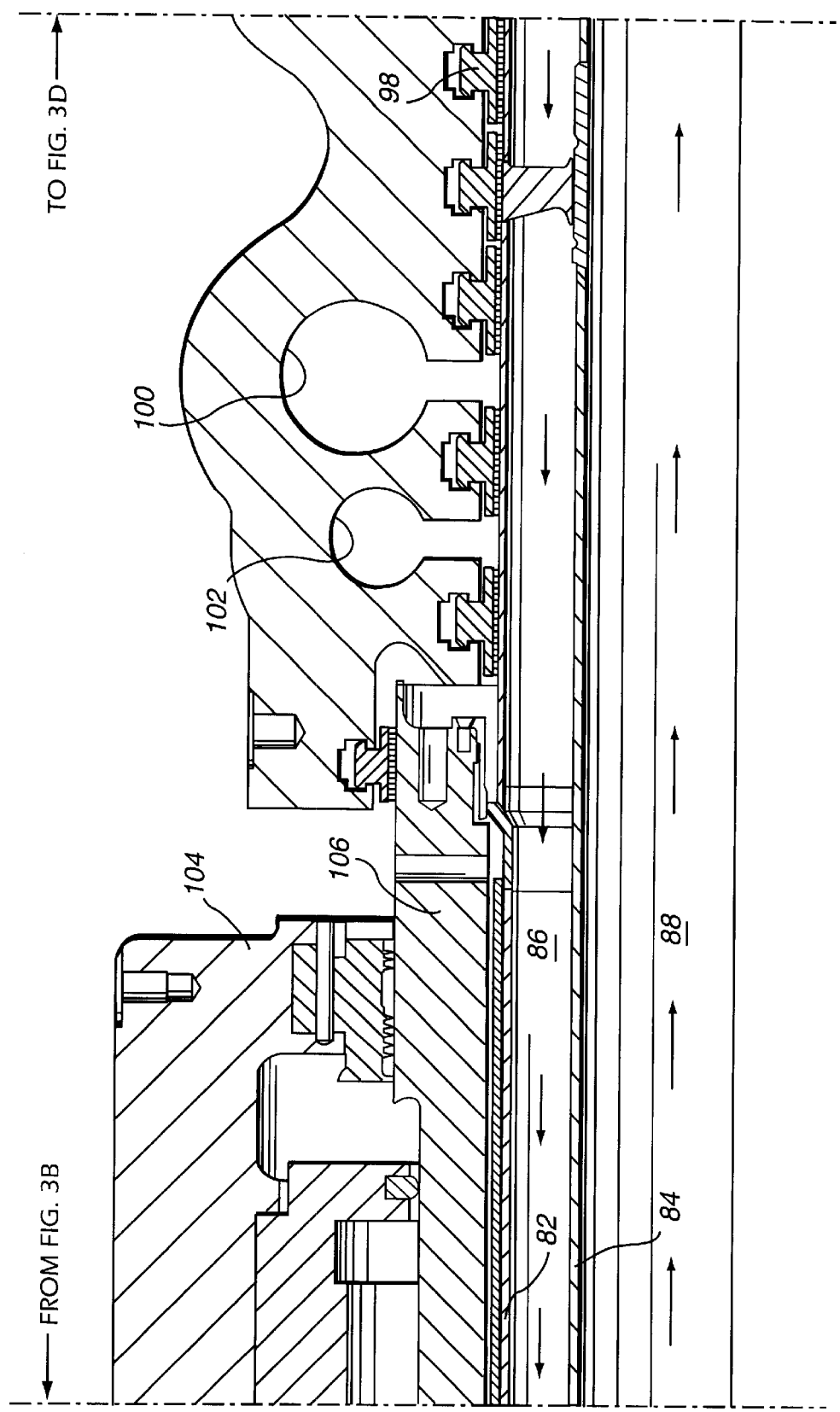
FIG. 3C is an enlarged cross-sectional view forming a continuation of the bore tube assembly illustrated in FIG. 3B.
Figure 3D:
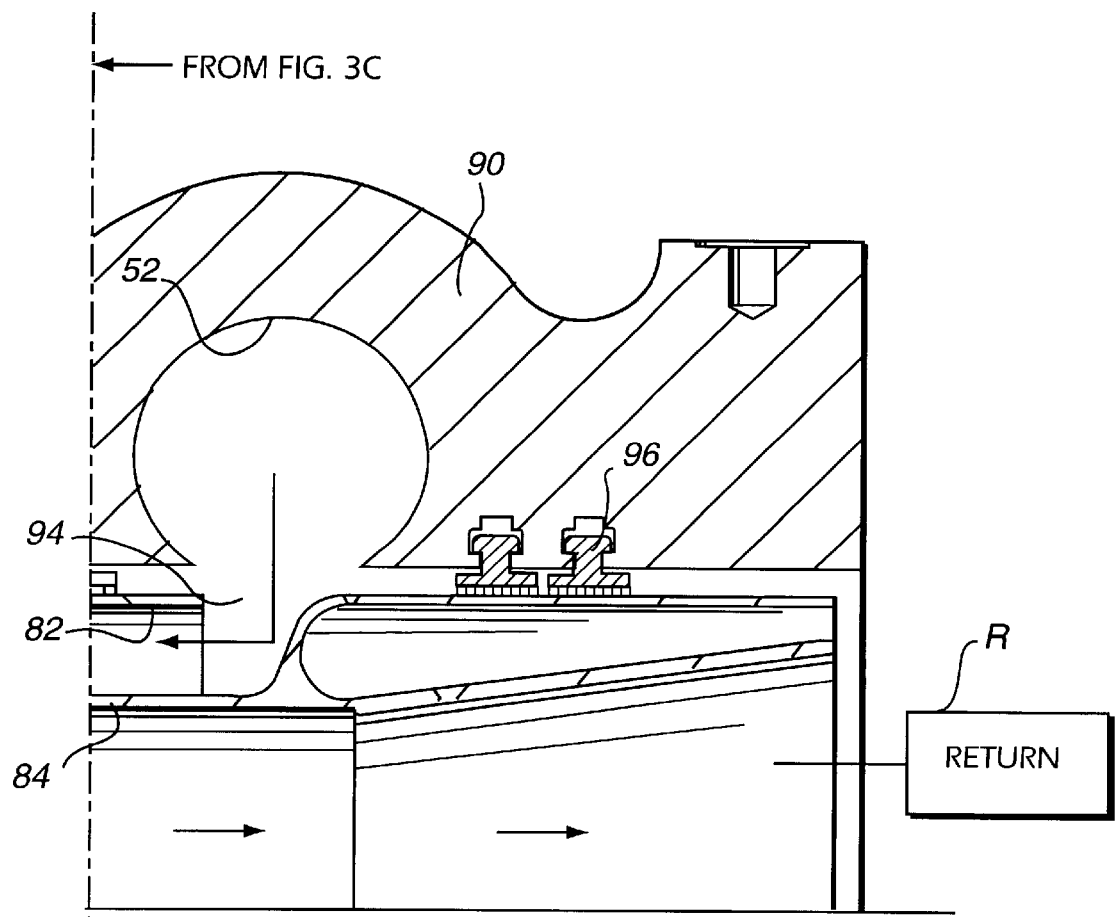
FIG. 3D is an enlarged cross-sectional view of the aft end of the bore tube assembly.

Referring now particularly to FIGS. 3B–3D, a bore tube assembly 48 forms part of the rotor and is mounted for rotation about the rotor axis A. The bore tube assembly 48 includes the aft disk 46 and provides a flow of cooling medium, for example, steam, to the turbine buckets and a passage for flow of the spent cooling medium to a return. As noted previously, the cooling system may be provided as part of a closed-circuit steam cooling supply and return system in a combined cycle system, i.e., split off from a high pressure steam turbine exhaust, or may be supplied from an existing in-plant supply. The bore tube assembly 48 includes an outer tube 82 and an inner tube 84 concentric with outer tube 82 about the axis of rotation of the rotor shaft. The outer and inner tubes 82 and 84, respectively, define an annular cooling steam supply passage 86, while the inner tube 84 provides a spent cooling steam passage 88. Referring particularly to FIG. 3C, a steam gland 90 is disposed about the bore tube assembly 48 and defines plenum 52. It will be appreciated that the steam gland 90 is fixed and the bore tube assembly 48 rotates about the shaft axis A. The steam plenum 52 is connected to a supply of steam from a suitable source, not shown, and lies in communication with a steam inlet 94 formed through the outer tube 82 for supplying cooling steam to the passage 86 between the outer and inner tubes 82 and 84, respectively. Referring to FIG. 3C, labyrinth-type seals 96 and 98, preferably spring-biased, are provided on opposite sides of the steam gland 90 for sealing about the outer tube 82. A variation on this design may employ brush seals instead of labyrinth seals or combined labyrinth seals and brush seals. The aft end of the steam gland 90 is connected with a stationary steam pipe schematically illustrated by return R for receiving spent cooling steam. The steam gland also includes leakage steam plenums 100 and 102 for collecting steam leaking past the labyrinth seals such that the steam will not flow outwardly to the aft main bearing 104 (FIG. 3C). The bearing 104 is a conventional bearing and includes the aft shaft 106 which is integral with the aft disk 46. Thus, the shaft 106 is rotatable with the bore tube assembly 80.

Referring to FIG. 3B, the forward end of the bore tube assembly 48 includes an end cap assembly, generally designated 108. The end cap 108 includes passageways for communicating the thermal medium from the thermal medium supply passage 86 to the radial tubes 54 and returning the spent cooling steam from the radial return tubes 60 to the return passage 88. For a detailed description of the end cap assembly 108, reference is made to U.S. patent application Ser. No. 09/216,363, filed Dec. 18, 1998, the disclosure of which is incorporated herein by reference.

Figure 4:
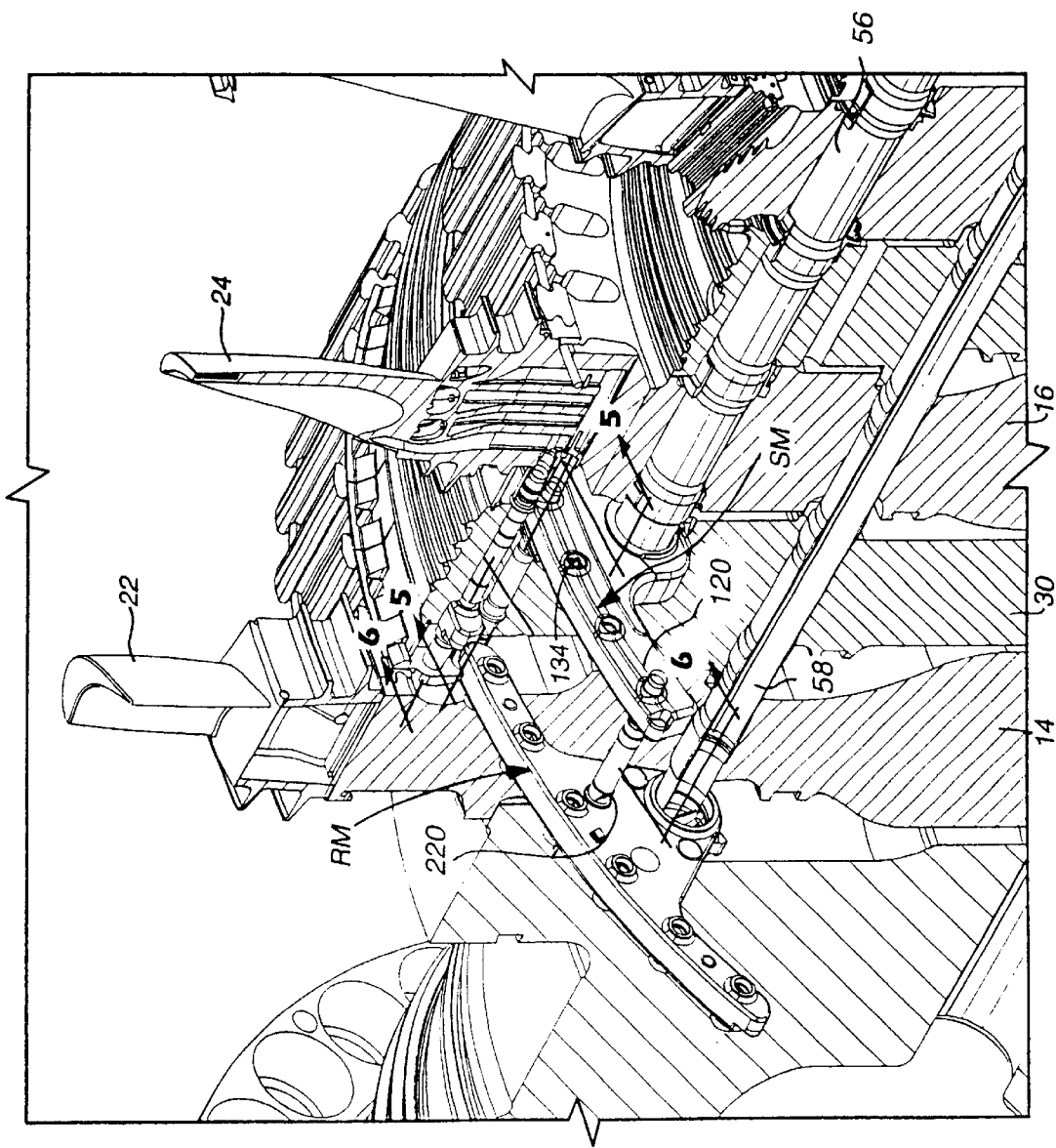
FIG. 4 is a fragmentary perspective view with parts broken out and in cross-section illustrating the supply and return tubes interconnected with supply and return manifold segments, respectively.
Figure 5:
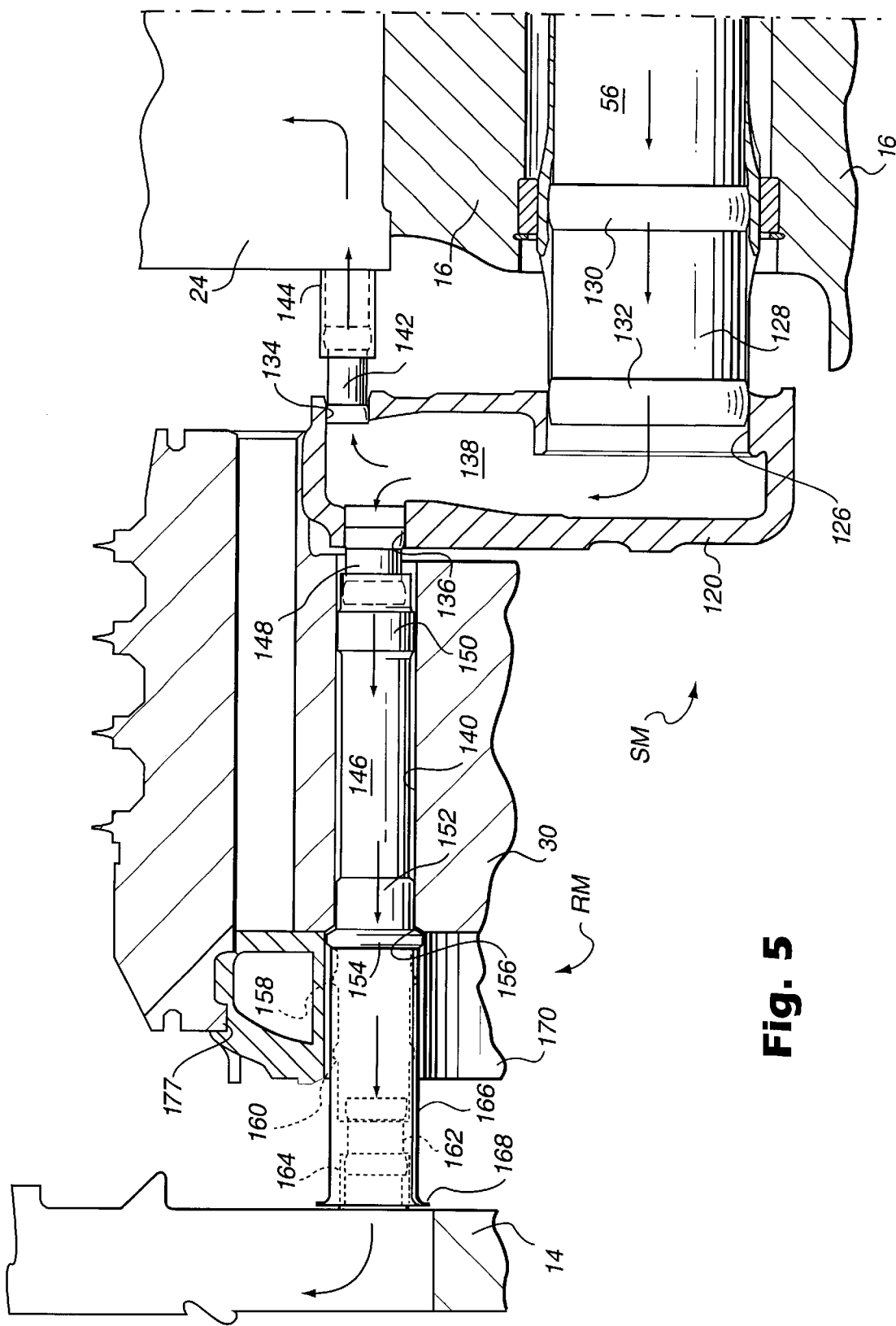
FIG. 5 is an enlarged fragmentary cross-sectional view illustrating a supply manifold segment and various passages communicating the cooling medium to the buckets of adjacent wheels and taken generally about on line 5—5 of FIG. 4.
Figure 9:
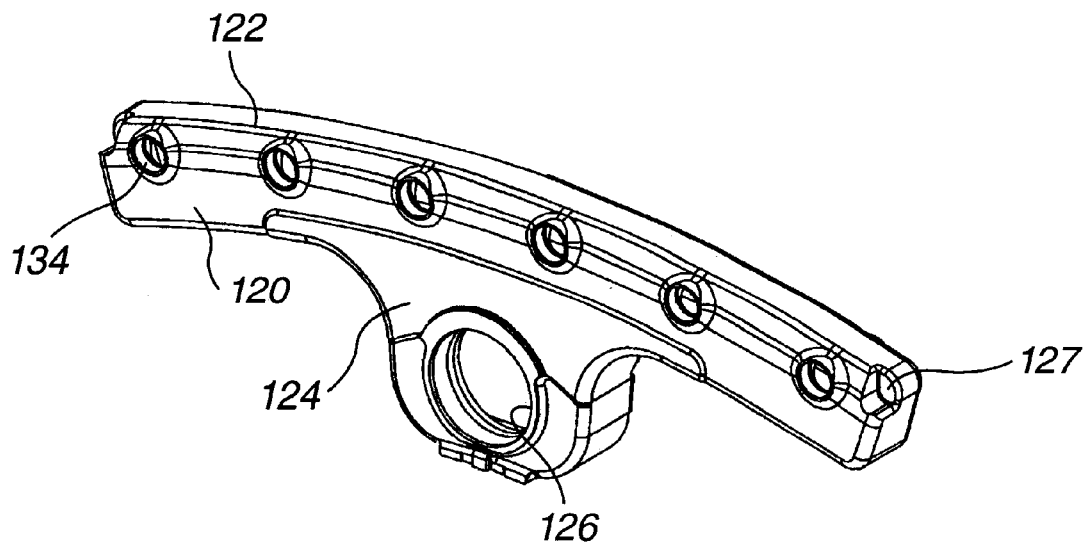

Referring now to FIGS. 4 and 5, it will be appreciated that each of the cooling medium supply tubes 56 supply cooling medium to a manifold, generally designated SM. Manifold SM comprises a plurality of circumferentially spaced supply manifold segments 120 (FIG. 9), preferably located between the aft face of the spacer 30 and the forward face of the second-stage wheel 16. A segment 120 is provided for each supply tube 56 and includes an arcuate rim 122 (FIG. 9) having a depending central and radially inwardly extending projection 124. Projection 124 has an inlet port 126 opening in an axially aft direction for connection with the cooling medium supply tube 56. More particularly, and with reference to FIG. 5, a spoolie 128 interconnects the forward end of a cooling medium supply tube 56 and the inlet port 126. The spoolie comprises a short tube having spherical-shaped end portions. For example, the spoolie 128 has a spherical-shaped end portion 130 for engaging an annular interior surface at the end of the cooling supply medium tube 56. Similarly, the opposite end of spoolie 128 has a spherically-shaped end portion 132 for engaging an annular interior surface of inlet port 126 of manifold segment 120. The spherical shape of the ends of all of the spoolies disclosed herein accommodate relative movement between the spoolie and the associated connected part or passage. In this particular instance, movement between each spoolie 128, the supply tube 56 and manifold segment 120 due to thermal expansion in an axial direction, as well as centrifugal loads, is accommodated.

The manifold 120 also includes a plurality of exit ports 134 and 136 along respective axial end faces thereof in communication with the plenum 138 (FIG. 5) within manifold segment 120. In the present example, the manifold segment 120 has six exit ports 134 opening in an axially aft direction for supplying cooling medium to the buckets of the adjacent wheel, e.g., the buckets of the second-stage wheel 16. Additionally, the manifold segment 120 includes six exit ports 136 (FIG. 5) opening in an axially forward direction. Each exit port 136 registers axially with a passage 140 through the spacer 30 between the first and second-stage wheels 14 and 16.

More particularly, a spoolie 142 is disposed between each of the aft exit ports 134 and a forward integral extension 144 of the bucket 24 of the wheel 16. The integral extension 144 is preferably integrally cast with the bucket and forms a cooling medium inlet for a second-stage bucket. It has been found that the extensions 144 can be provided at less cost if integrally cast in solid block form with the bucket dovetail castings. After the extension block is cast, it is machined, i.e., drilled to provide the axial entry openings to accommodate the spoolies 142. Such initial integral casting in block form provides improved tolerance of true position of the openings in the bucket dovetail. It will be appreciated, however, that a separate hollow tube could be brazed into a pre-drilled hole in the bucket dovetail to accommodate the spoolie 142. The spoolie 142 is of a type similar to spoolie 128, i.e., having spherical end portions for seating in portions of the exit port 134 and extension 144.

Each of the passages 140 is provided with a supply crossover tube 146 which communicates with the axially forward facing exit port 136 from supply manifold segment 120 by way of a further spoolie 148. Thus, the aft end of each crossover tube 146 has an annular seat for receiving the forward spherical portion of the spoolie 148 while the exit ports 136 likewise each have an annular seat for receiving the aft spherical portion of the spoolie 148. As illustrated in FIG. 5, each crossover tube 146 has a diametrically enlarged land 150 adjacent an aft end thereof and a diametrically enlarged land 152 intermediate the length of the crossover tube. Each crossover tube 146 also includes a radially enlarged flange 154 at the forward end of enlarged portion 152 for seating against a chamfer 156 at the forward end of opening 140 through spacer 30. Each crossover tube 146 extends forwardly toward the first-stage wheel 14 and additionally has a pair of axially spaced flanges 158 and 160, forming retention sleeve standoffs on a cantilevered forward end portion of tube 146. The forward end of crossover tube 146 is connected to a spoolie 162 which, in turn, is connected at its opposite end to an aft extension 164 of a bucket of the first-stage wheel. Extension 164 thus forms a cooling medium inlet for a first-stage bucket. Crossover tube 146 is fixed against axial movement in the aft direction, i.e., from left to right in FIG. 5, by engagement of the flange 154 against the face of spacer 30. Each aft extension 164 of each bucket of the first-stage wheel is preferably integrally cast with the bucket dovetail in block form with machined axial openings similarly as extensions 144.

Retention sleeves 166 overlies the flanges 158 and 160 of crossover tubes 146 and each sleeve 166 has its aft end in engagement against flange 154. The opposite end of each retention tube is flared outwardly at 168 and is spaced a limited distance from the aft face of the bucket of the first stage to accommodate axial expansion of the crossover tube 146. For details of the crossover tube and retention sleeve, reference is made to co-pending application Ser. No. 09/312,334, filed May 14, 1999, the disclosure of which is incorporated herein by reference.

The supply manifold also includes recesses 127 (FIG. 9) at the tips of the wings of the manifold and along the aft face thereof. Circumferentially spaced, radially inwardly directed flanges on the aft face of the spacer 30 engage in the recesses to retain the supply manifold in position together with its connection with the supply tube.

To recapitulate, the circumferentially spaced, axially extending cooling medium supply tubes 56 supply cooling medium, preferably steam, to the plenums 138 of the supply manifold segments 120 arranged circumferentially about the rotor. The cooling medium flows through the exit ports 134 in an axially aft direction for supplying cooling medium to the buckets 24 of the second-stage wheel 16. The cooling medium is also supplied via the exit ports 136 in an axially forward direction for flow through the crossover tubes 146 and into the buckets 22 of the first-stage wheel 14. The flow within the buckets of the first and second-stage wheels forms no part of the present invention, although the flow path through a bucket 24 of the second-stage is illustrated in FIGS. 3A and 4.

Figure 6:
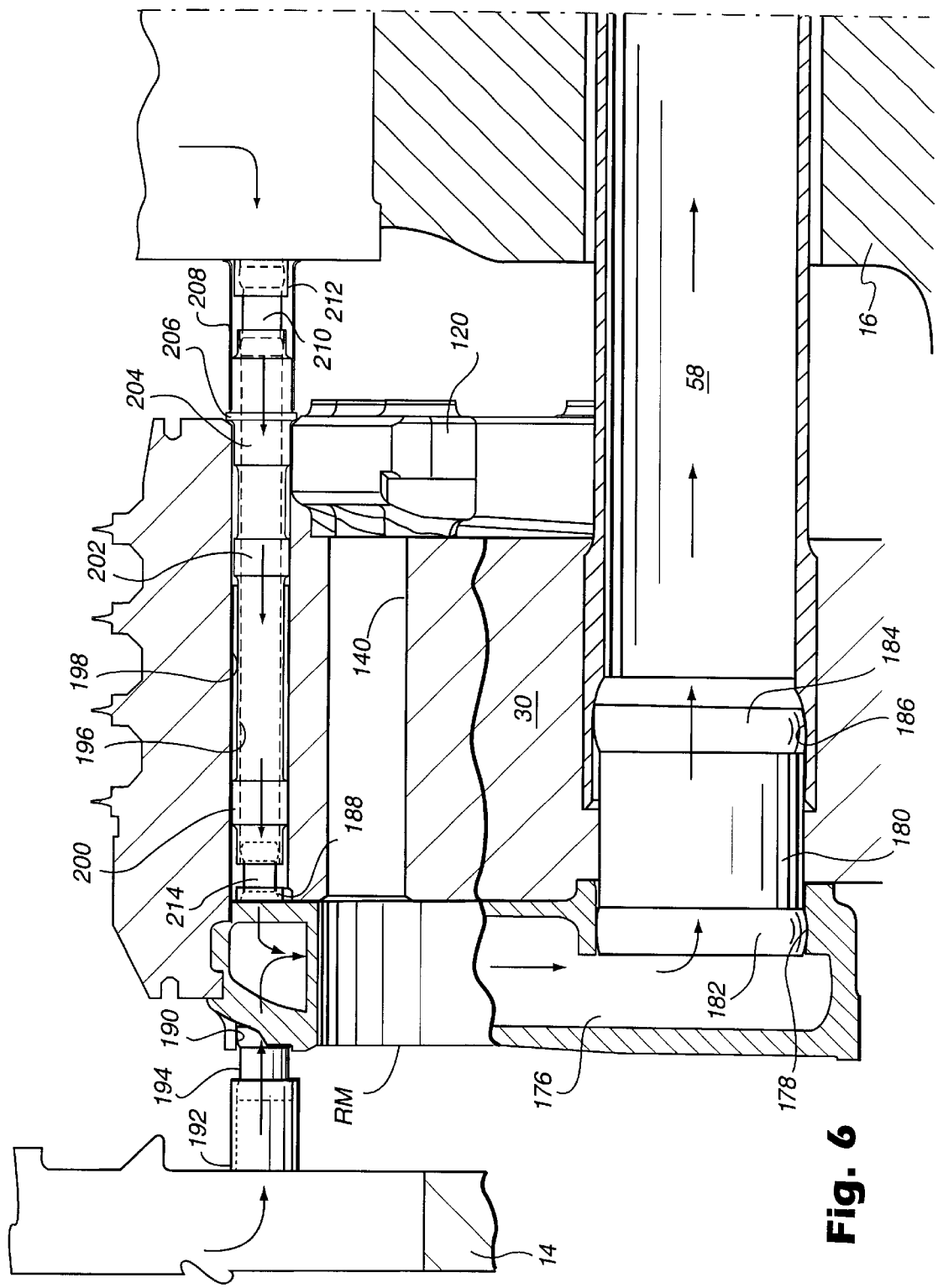
FIG. 6 is a fragmentary cross-sectional view illustrating a return manifold segment for returning spent cooling medium from axially adjacent buckets to a return tube and taken generally about on line 6—6 of FIG. 4.
Figure 7:
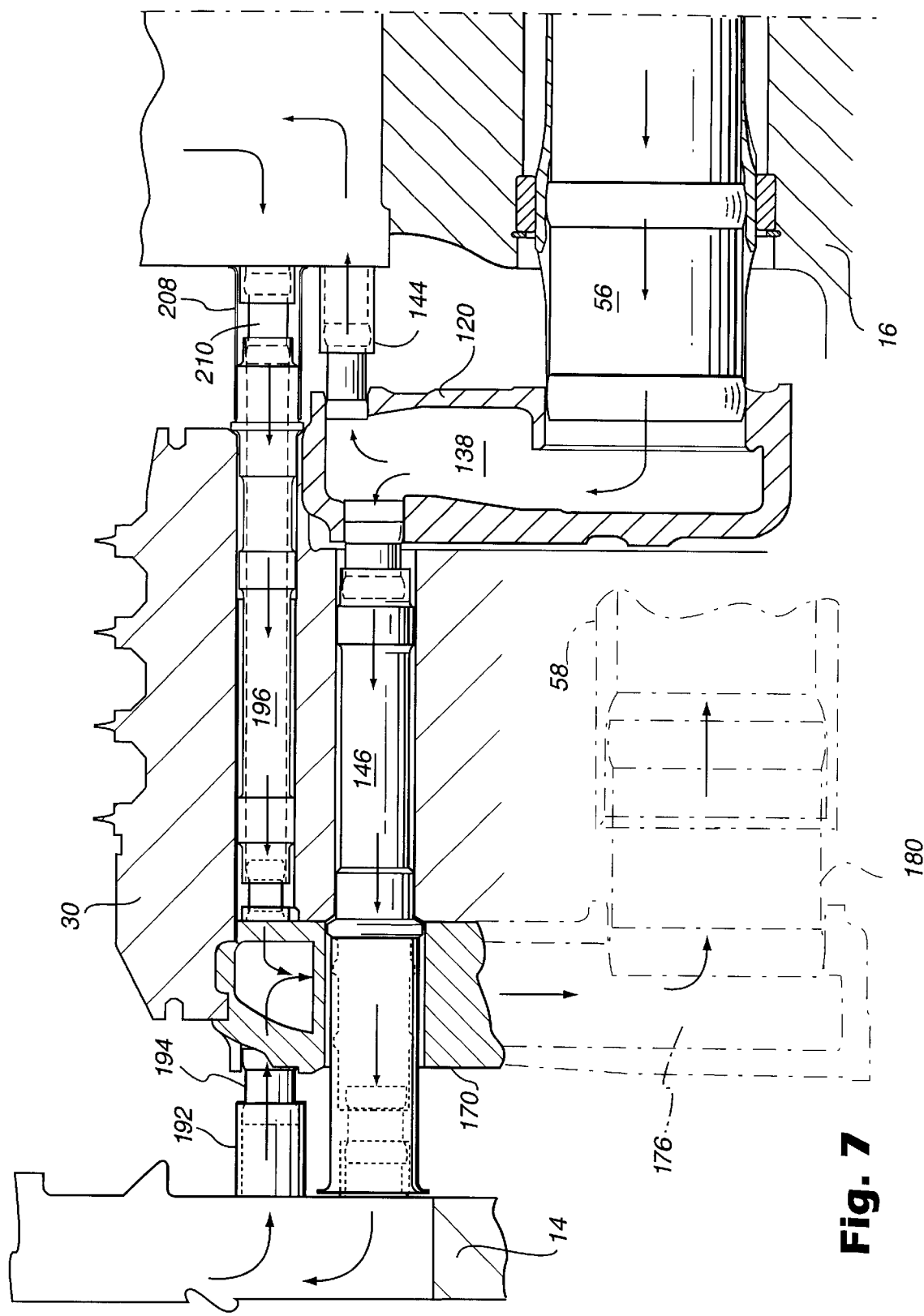
FIG. 7 is a reduced cross-sectional view illustrating the relationship between the supply and return manifold segments.
Figure 8:
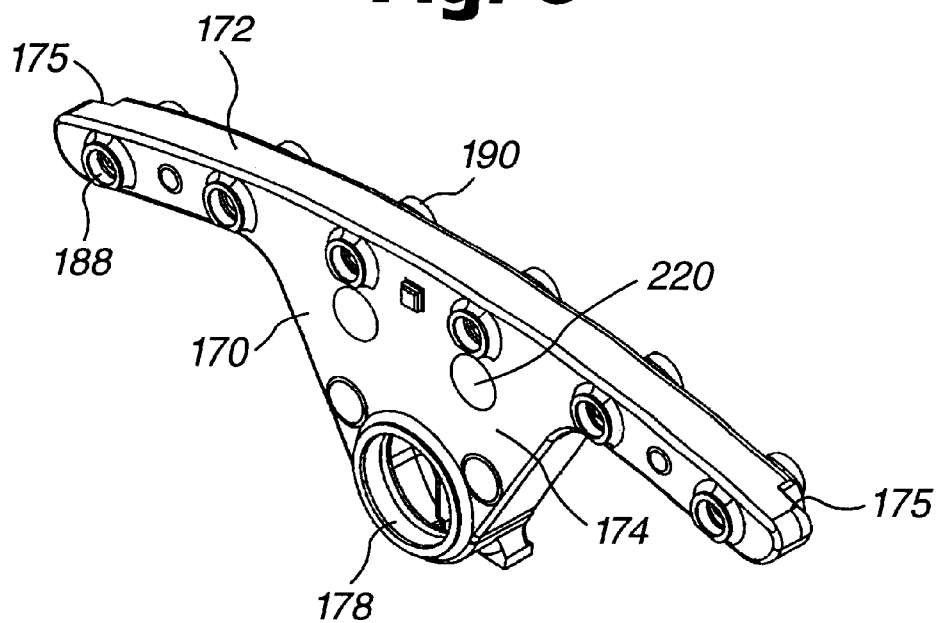
FIGS. 8 and 9 are perspective views of the return and supply manifold segments, respectively.

Referring now to FIG. 6, spent cooling medium from the buckets of the first and second-stage wheels returns to return manifolds, generally designated RM, which, in turn, supply the spent cooling steam to the return tubes 58. The return manifolds RM comprises a plurality of circumferentially spaced return manifold segments 170 (FIG. 8), preferably located between the forward face of the spacer 30 and the aft face of the first-stage wheel 14. Referring to FIG. 8, each segment has a radially outer rim 172 and an inwardly extending projection 174, the rim 172 and projection 174 defining a plenum 176. Each projection 174 has an exit port 178 opening in an axially aft direction for flowing return steam from the manifold segment 170 to the return tube 158 by way of a spoolie 180. The outlet or exit port 178 has a generally annular seat for mating engagement with the spherical end portion 182 of the spoolie 180. The opposite end of the spoolie 180 has a similar spherical portion 184 for engaging an annular seat 186 at the forward end of the return tube 58.

The rim 172 of each return manifold segment 170 includes a plurality, for example, six, inlet ports 188 opening in an aft direction, as well as a plurality, for example, six, inlet ports 190 opening in a forward direction. To communicate spent cooling medium from the buckets 22 of the first stage to manifold segment 170, an extension 192 is preferably integrally cast on the aft face of each of the bucket dovetails of the first-stage buckets 22 and forms a cooling medium outlet therefor. A spoolie 194 having opposite spherical end portions seats in annular portions at the end of each extension 192 and each inlet ports 190, respectively. Consequently, spent cooling medium flows from the buckets 22 of the first stage through the extensions 192, spoolies 194 and inlet ports 190 into the circumferentially arranged manifold plenums 176.

To communicate spent cooling steam from the buckets 24 of the second stage to the return manifold plenum 176, a plurality of crossover return tubes 196 are provided through axially extending bore holes 198 through the intervening spacer 30. The return crossover tubes 196 each have lands 200, 202 and 204 for engaging the bore hole 198. An enlarged diameter flange 206 bears against the margin of the opening 198 through spacer 30 to prevent forward axial movement of the return crossover tube 196. A retention sleeve 208 engages the flange 206 at one end and has a flared opposite end defining a small axial gap with the forward face of the second-stage bucket. Consequently, the crossover tube 196 is fixed against axial movement in a forward direction by engagement of its flange 206 against the aft face of spacer 30 and limited in its axial rearward movement by engagement of the flared end of the retention sleeve against the forward face of the second-stage buckets, the forward end of the sleeve 208 bearing against flange 206.

As in previous embodiments, spoolies 210 interconnect forward preferably integrally cast extensions 212 of the second-stage buckets with the aft ends of the crossover tubes 196, extensions 212 forming cooling medium outlets for the second-stage buckets. Similarly, spoolies 214 interconnect between the forward ends of the return crossover tubes 196 and the inlet ports 188 of the return manifold segments 170. The spoolies 210 and 214 are of similar construction as previously described, i.e., having spherical portions at opposite ends for seating in annular surfaces of the adjoining parts.

As illustrated in FIG. 6, it will be appreciated that the crossover tubes 196 pass over the axially adjacent radially inset supply manifold segment 120. Referring back to FIGS. 4 and 5, however, it will be seen that at least a pair of the supply crossover tubes 146 interconnecting the supply manifold segments 120 and the first-stage buckets 22 and located at the opposite ends or tips of the supply manifold segments rims 122 pass axially through openings 220 (FIG. 4) formed in a central portion of the return manifold segment 170 at the same circumferential locations. The remaining supply crossover tubes 146 from the supply manifold segments 120 pass under the outer wings of the rims 172 of circumferentially adjacent return manifold segments 170. Also note from a review of FIG. 4 that not only are the supply manifold segments 120 spaced radially inwardly of the return manifold segments 170 but the segments 120 and 170 are staggered relative to one another in a circumferential direction.

Each return manifold segment also includes recesses 175 at the tips of the wings of the manifold segment and along a forward face thereof. Circumferentially spaced radially inwardly directed flanges 177 (FIG. 5) on the forward face of the spacer 30 engage in recesses 175 to retain the return manifold segment in position together with the return tube.

To recapitulate the return cooling system for the buckets of the first and second stages, spent cooling medium, e.g., steam, flows aft from the first-stage buckets 22 through dovetail extensions 192 and spoolies 194 into return manifold segment plenums 176 via inlet ports 190. Spent cooling steam from the second-stage buckets 24 flows forwardly from the bucket dovetail extensions 212 via spoolies 210 and crossover tubes 196 and spoolies 214 into the return manifold segment plenums 176 via inlet ports 188. The spent cooling steam flows from plenums 176 by way of spoolies 180 into return tubes 58 for flow through the associated elbow and radial tube and axial passage 88 to the return.

It will also be appreciated that while the connecting part may have an annular seat, the spherical end portions 132 of the thin-wall spoolies may interface with spherical seats on the mating parts to prevent disengagement and/or crushing during operation. Spherical seats are particularly significant in radial orientations of the spoolies to prevent radial movement under centrifugal loads. The interference fit at the spoolie ends prevents leakage, provides a sufficient preload to overcome centrifugal loads and affords self-alignment during operation. The spherical ends of the spoolies are preferably coated with Triballoy 800. An example of a spherical end portion of a spoolie and a spherical seat therefor is illustrated in FIG. 15. The spoolie 249 may comprise any one of the spoolies 128, 142, 148, 162, 194, 210, 214 or 170 having spherical end portions 251. The adjoining parts 253 may have annular seats or the spherical seats 255 as illustrated.

Figure 10:
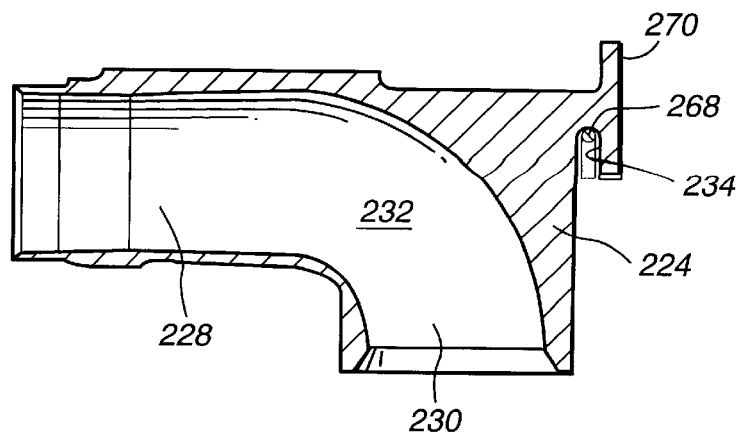
FIGS. 10 and 11 are cross-sectional views of supply and return elbows, respectively, for turning the cooling medium between axial and radial flow directions.

Referring now to FIGS. 2, 3B and 10–14, the interconnections, e.g., elbows, in the aft disk 46 for transitioning the supply and return thermal medium between axial and radial directions will now be described. Referring to FIG. 2, the aft disk 46 includes a plurality of circumferentially spaced generally dovetailed radially opening slots 222. The slots 222 receive supply and return interconnections, e.g., flow turning elements comprising elbows 224 and 226, respectively. Each of the elbows has a generally complementary-shaped exterior surface to the dovetails about aft disk 46 such that the elbows can be axially inserted into the slots 222 and retained against radial outward movement. Referring to FIG. 10, a supply elbow 224 is illustrated. Supply elbow 224 is preferably formed of cast material and has a longitudinally extending bore section 228 and a radial extending bore section 230 in communication with one another through a transition bore 232 turning 90° as illustrated. The aft end of the elbow 224 includes a groove 234 opening radially inwardly.

Figure 11:
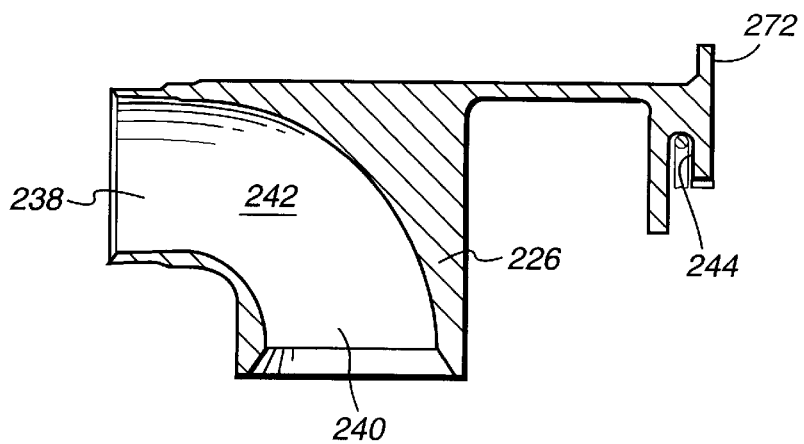

Referring to FIG. 11, a return elbow 226 is illustrated. Return elbow 226 includes an axially extending bore opening 238 and a radially extending bore opening 240 in communication one with the other through a transition bore 242 turning 90°. The aft end of the return elbow 226 also includes a groove 244 opening radially inwardly. It will be appreciated that the radially opening bores 230 and 240 of the supply and return elbows 224 and 226, respectively, are both circumferentially and axially offset one from the other to accommodate the circumferentially and radially offset supply and return tubes 54 and 60, respectively.

The axially extending bores 208 and 218 of the supply and return elbows 224 and 226, respectively, interconnect with the axially extending supply and return tubes 56 and 58 by way of spoolies constructed similarly as the spoolies previously described. An example of a spoolie 246 for interconnecting the return elbow 226 and the return axially extending tube 58 is illustrated in FIG. 3A. A similar spoolie interconnects each of the supply elbows 224 and the supply tubes 56.

Figure 12:
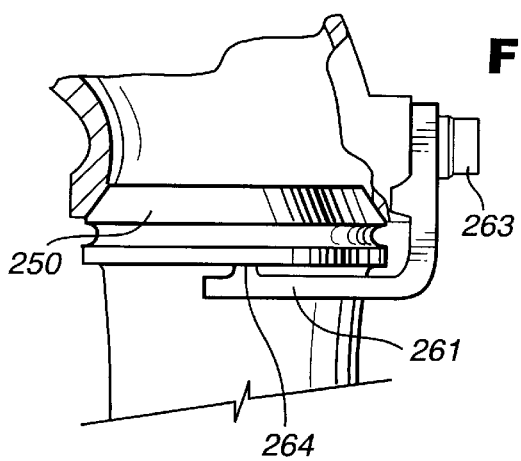
FIG. 12 is a fragmentary side elevational view with parts in cross-section illustrating a connection between an elbow and a radially extending thermal medium carrying tube of the aft disk.
Figure 13:
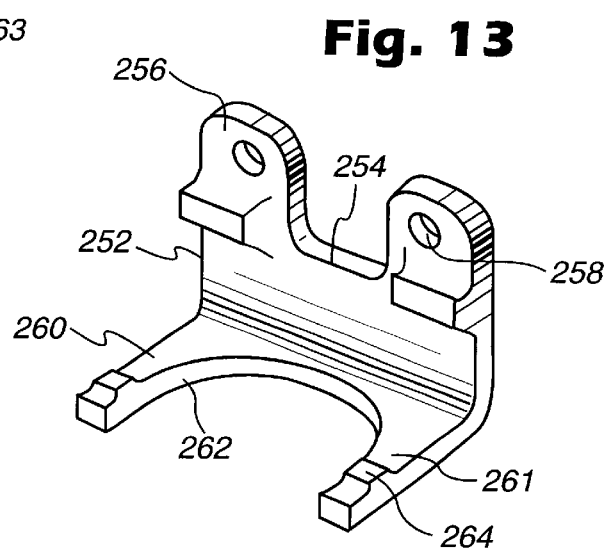
FIG. 13 is a perspective view of a spring clip for effecting connection between the elbow and radial tube.

Referring to FIG. 12, each of the radially outer ends of the supply and return tubes 54 and 60, respectively, has a collar 250. The outer end of the collar is flared for flared mating engagement with the radial extending bore 230 or 240 of the associated elbow to establish fluid communication between the elbow and radial tube. To interconnect the radial tubes and the flow turning elements, e.g., the elbows, connecting members, e.g., spring clips 252, illustrated in FIG. 13, are provided. Each spring clip comprises an angle having a radial portion 254 mounting circumferentially spaced radially outwardly directed bosses 256 with openings 258. The generally axially extending portion 260 of the spring clip 252 has a pair of axially extending legs 261 defining a generally semi-circular opening 262 and terminating in a pair of radially outwardly projecting bosses 264 adjacent distal ends thereof. As illustrated in FIG. 12, the spring clip 252 is bolted to the associated elbow 224 or 226 with the bolts 263 with the arms of the axial section 260 underlying the collar 250. Specifically, the bosses 264 engage the undersides of the collar 250. It will be appreciated that, because the supply and return radial tubes 54 and 56, respectively, are axially offset from one another, the legs 261 of the clips used to secure the radially outer ends of the return tubes 60 are longer than the legs 26 of the clips used to secure the ends of the supply tubes 54.

As illustrated in FIG. 3B, the aft face of the aft disk 46 between the slots 220 has radially inwardly opening grooves 266. It will be appreciated that when the elbows 224 and 226 are axially inserted into the slots 222, a circumferentially extending band or wire 268, which may be spring-loaded in a radially outer direction, is inserted into the grooves 234, 244 and 266 to retain the elbows against axial displacement in an aft direction, the grooves 266 and band 268 forming axial stops for the elbows. The aft flanges 270 and 272 of the elbows 224 and 226, respectively, butt against the aft face of the aft disk 46 to preclude forward axial movement of the elbows relative to the rotor. FIG. 14 illustrates a supply and return elbow in the corresponding slots 222 of the aft disk 46.

Figure 18:
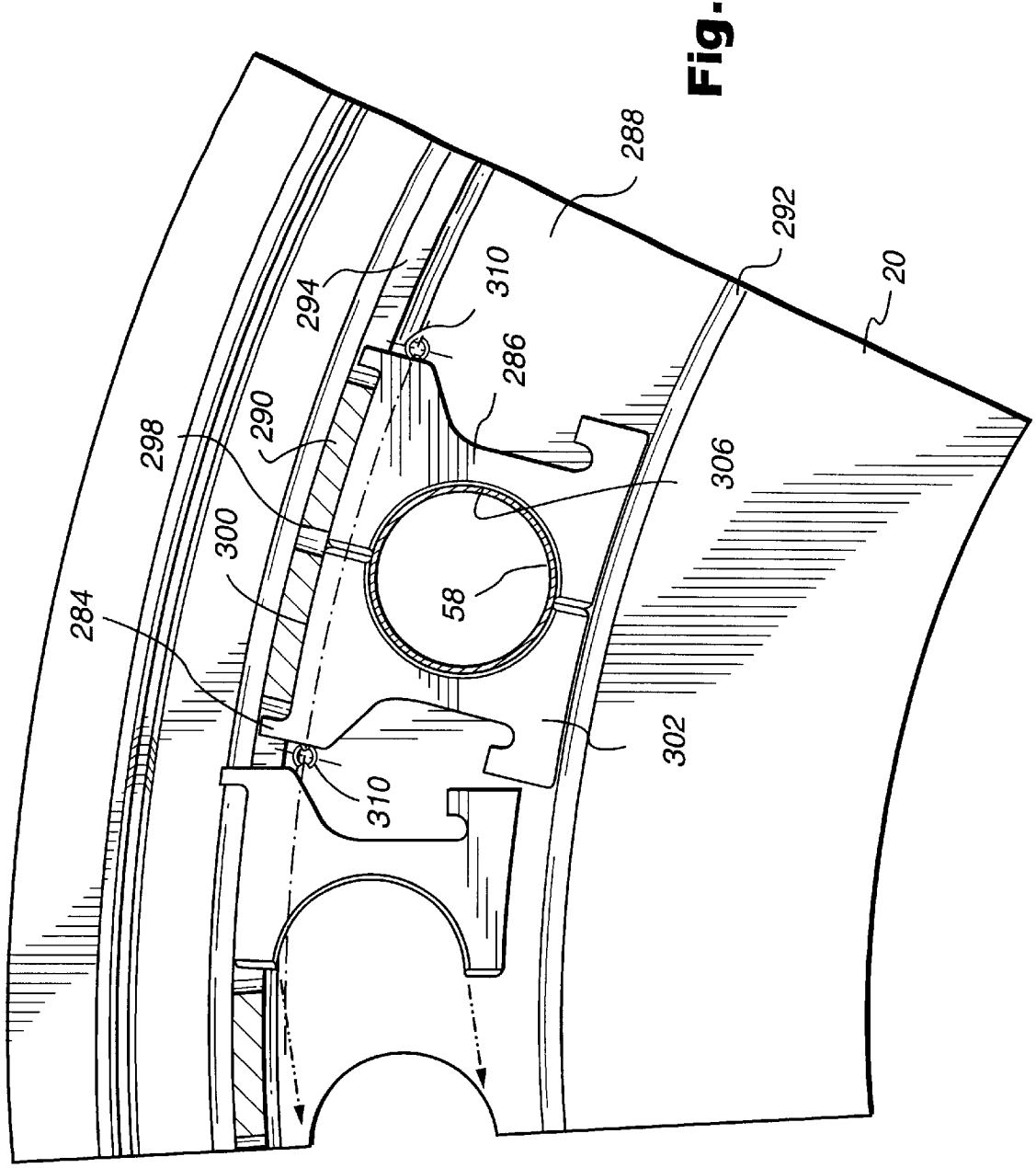
FIG. 18 is a fragmentary end elevational view of the aft end face of the fourth wheel of the four-stage turbine.
Figure 19:
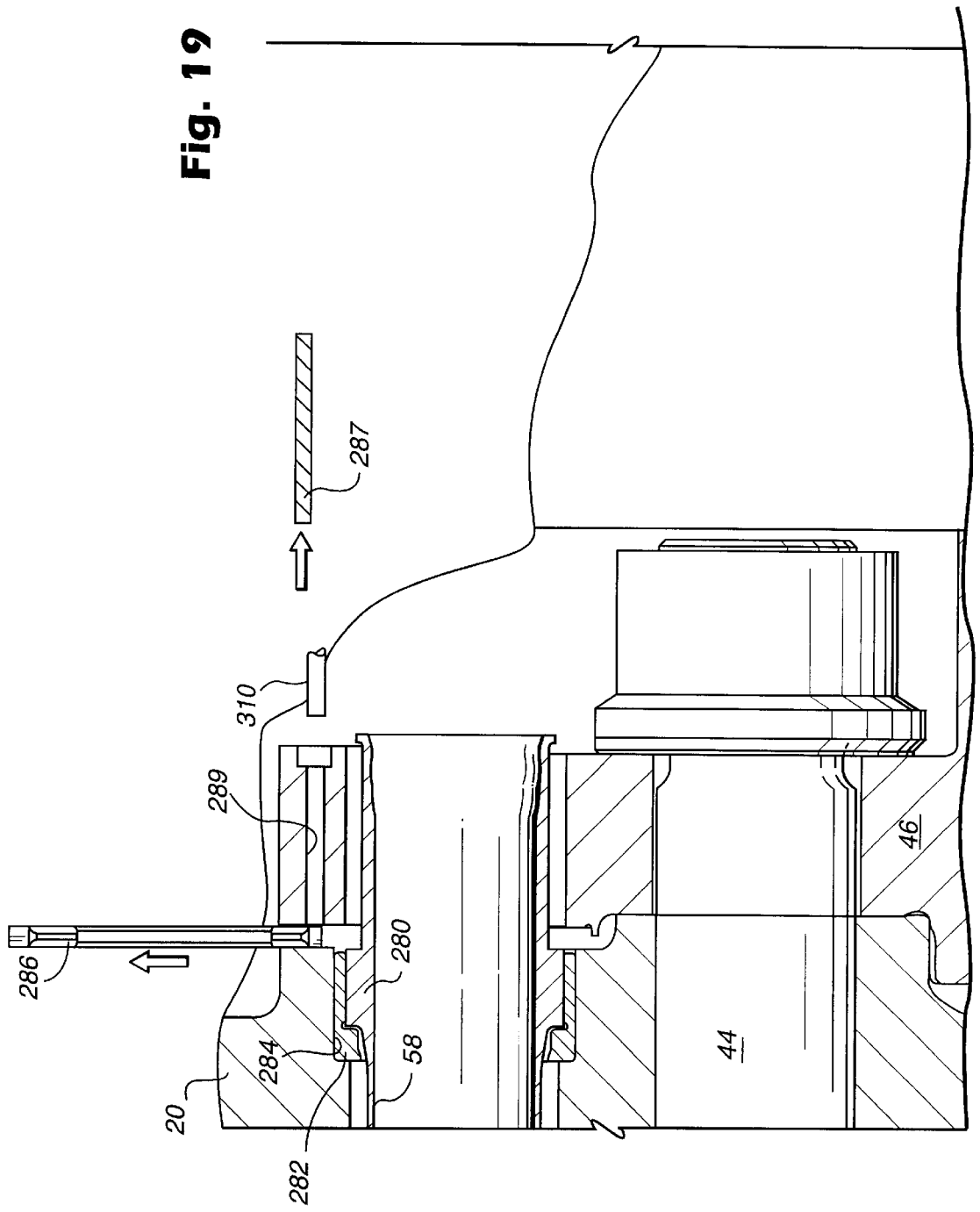
FIG. 19 is a fragmentary cross-sectional view thereof illustrating the removal of the retention plates illustrated in FIG. 18.

Referring now to FIGS. 18 and 19, retention assemblies are illustrated for fixing the aft ends of the supply and return tubes 56 and 58 to the rotor. In FIG. 19, a tube, for example, return tube 58, is illustrated with a radially enlarged land 280. A bushing 282 is disposed in a counterbored recess 284 in the aft face of the fourth wheel 20. The forward edge of the raised land 280 of tube 58 bears against an interior flange of bushing 282 to prevent forward axial movement of the tube. The rear shoulder of each land bears against a pair of retention parts, e.g., plates 286, precluding movement in a rearward direction. The retention plates 286 in turn bear against a forward face of the aft disk.

Referring to FIG. 18, the aft wheel face includes an annular recess 288 through which pass the openings for receiving the tubes. The recess 288 is bounded radially by flanges 290 and 292 which form radial inner and outer stops, respectively, for retention plates 286. The radial outer flange 290 includes a plurality of circumferentially spaced indents or slots 294 which afford access openings for removal of the retention plates 286 as described below. A reduced access slot 298 is formed in the flange 290 at circumferentially spaced positions about the aft face of the wheel at each tube opening location, affording an access slot to the retention plate whereby the plate can be shifted to a position for removal.

As illustrated in FIG. 18, each retention plate 286 includes curved outer and inner edges 300 and 302, respectively, corresponding to the curvature of the respective flanges 290 and 292 so that the plates can be received between the flanges. An ear 304 projects outwardly from the radially outer edge 300 of the retention plate and projects into one end of the access slot 294 of the outer flange 290. The retention plates of each retention assembly are mirror-images of one another. The inside edge of each plate has a semi-circular edge 306 corresponding in radius to the radius of the tube. Consequently, the retention plates 286 are located between flanges 290 and 292 and straddle circumferentially opposite sides of the tube 58. To lock the retention plates 286 in position behind the raised land 282, a pair of pins, i.e., stops 310, are inserted into openings in the face of the aft wheel and engage the circumferential outer edges of the retention plates 286 to prevent circumferential separating movement of the plates 286 from their positions straddling the tube. Access to pins 310 for their removal and removal of the retention plates is obtained after removal of the overlying windage plates. The pins 310 are then withdrawn rearwardly from the aft shaft by inserting a tool through the slot 294. Upon removal of the pins 310, each retention plate can slide in a circumferential direction away from its retained tube for radial alignment with the slot 294. With that alignment, the retention plates are positioned for withdrawal in a radial outward direction.

Figure 16:
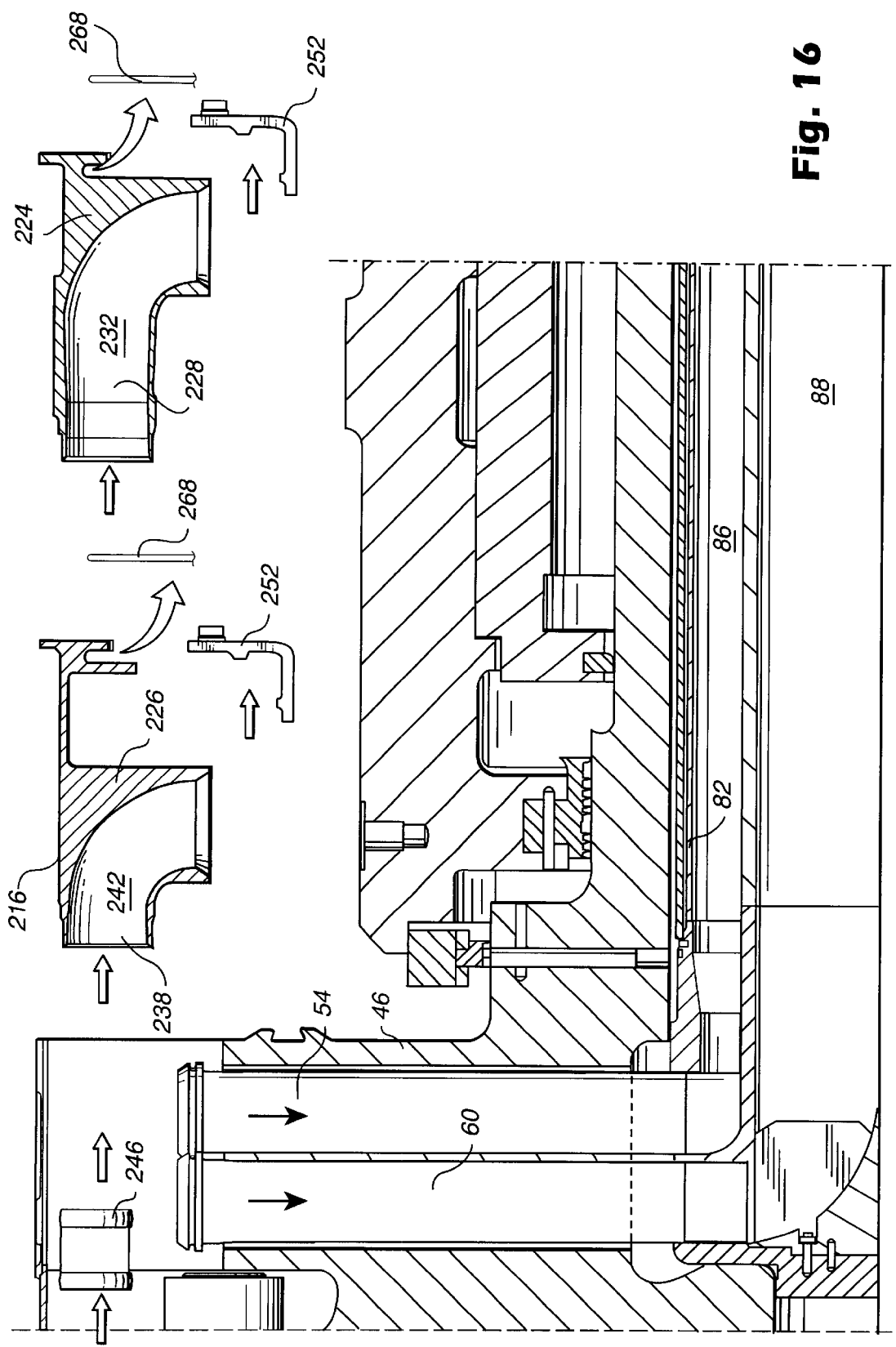
FIG. 16 is a view similar to FIG. 3 with parts removed and the directions of their movements facilitating removal illustrated.
Figure 17:
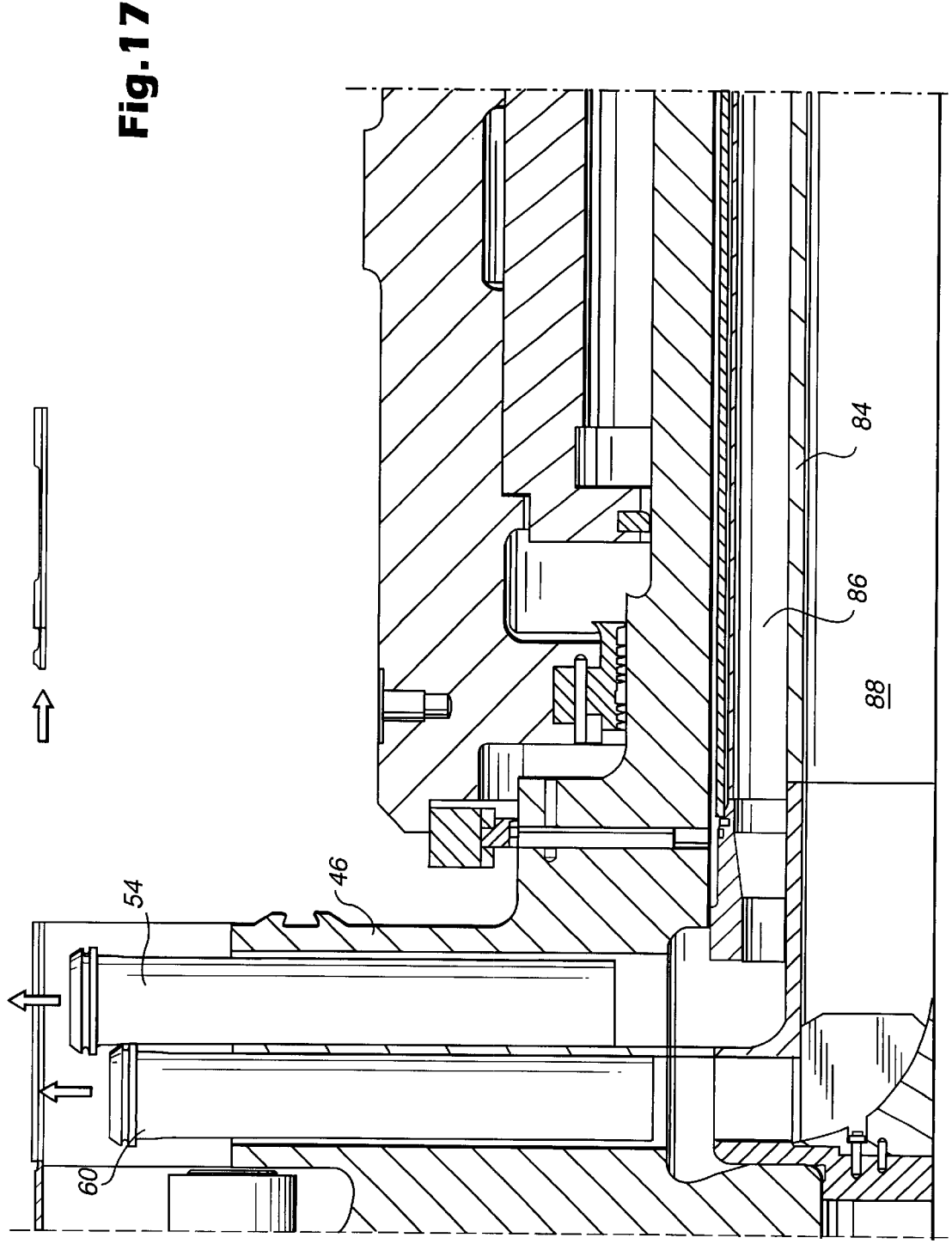
FIG. 17 is a view similar to FIG. 16 illustrating the radial removal of the radial tubes.

Referring now to FIGS. 3B and 16, the method of disassembling the parts comprising the steam cooling circuit will now be described. As will be recalled, the elbows 224 and 226 are retained in the position illustrated in FIG. 3 by the retaining wire 268. Also, the spring clips 252 are bolted to the elbows and serve to retain the radial tubes 54 and 60 in radially outermost positions. To remove the radial tubes and the axial tubes, the wire 268 is first removed and the bolts 263 for the spring clips 252 are unthreaded from the elbows and likewise removed. By removing the spring clips 252, the radial tubes 54 and 60 are exposed at their upper ends and released for radial inward movement. By displacing the tubes 54 and 60 radially inwardly, the elbows 224 and 226 are freed for axial sliding movement in an aft direction. The cover plates that are above the elbows are also released. The spoolies immediately connecting the elbows to the axial tubes are also removed axially, either with the elbows or may be withdrawn in an axial aft direction separately from the elbows. In FIG. 16, a spoolie 246 for interconnecting the return elbow 226 and the return tube 58 is illustrated. With the elbows and spoolies removed, the radial tubes 54 and 60 are withdrawn in a radial outward direction as illustrated in FIG. 17.

Figure 20:
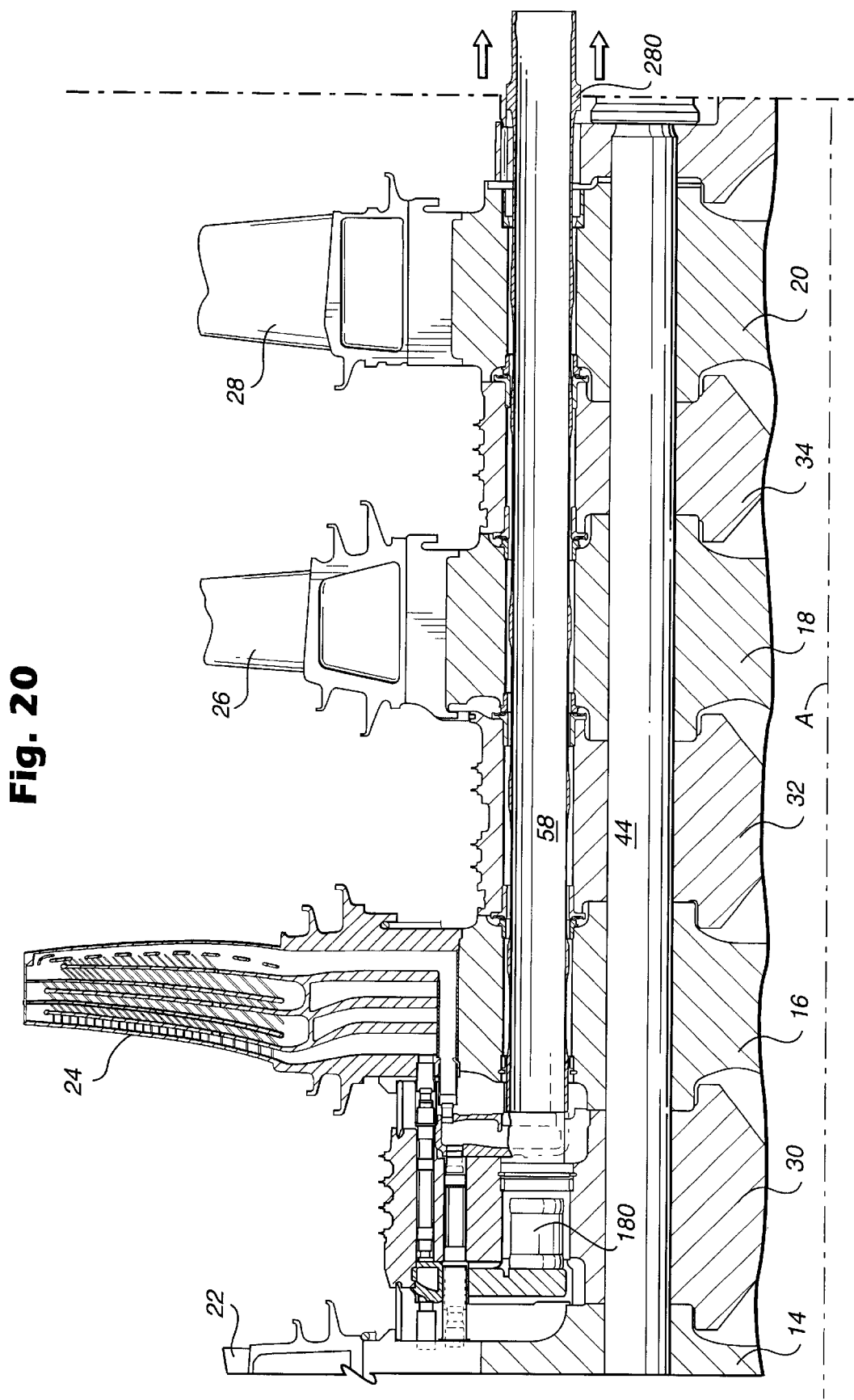
FIG. 20 is a view similar to FIG. 3A illustrating removal of the return tube in an axially aft direction.
Figure 21:
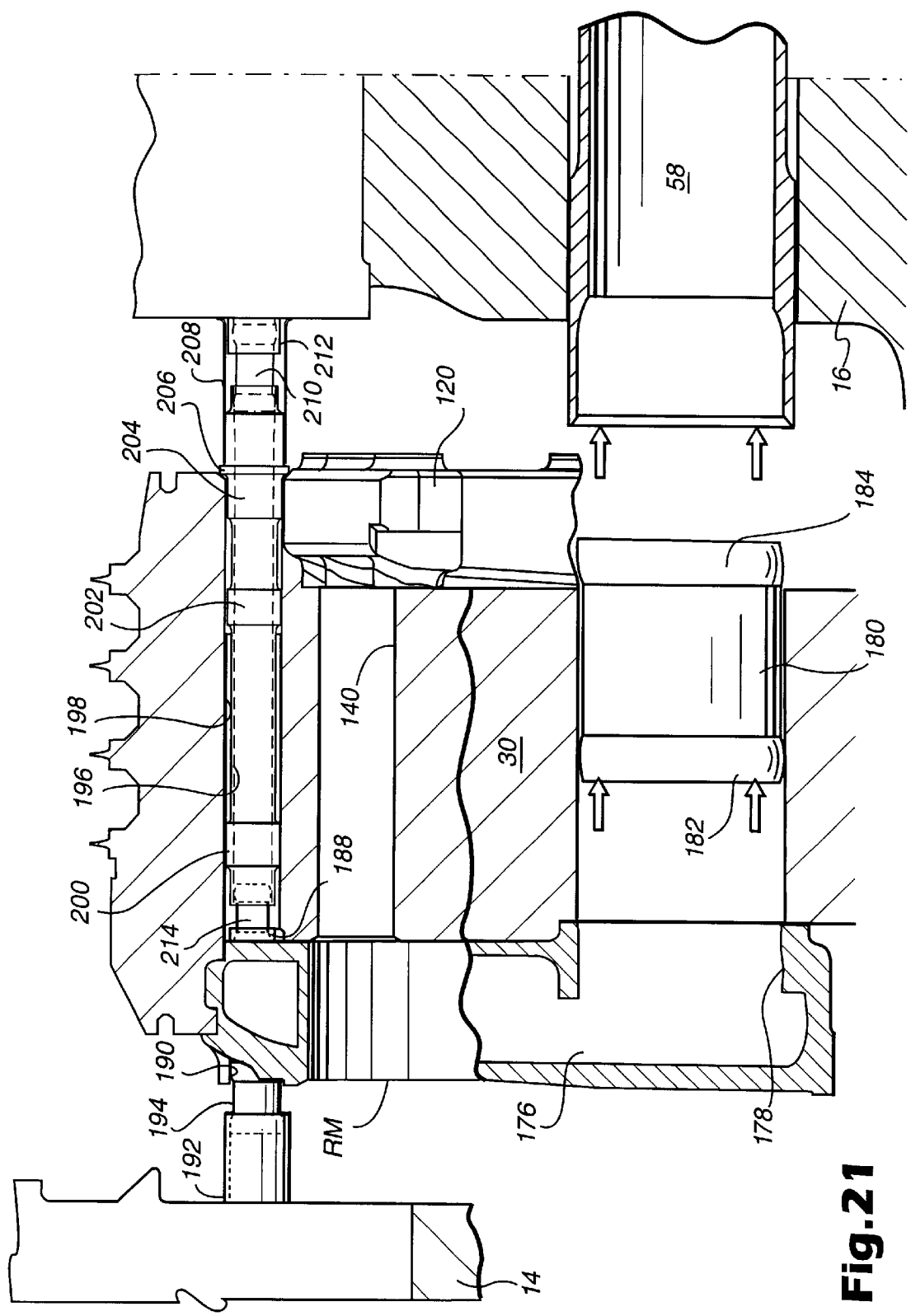
FIG. 21 is a view similar to FIG. 6 illustrating removal of the return tube and spoolie in an axially aft direction.

Referring now to FIGS. 18 and 19, the supply and return axial tubes 56 and 58, respectively, can be withdrawn axially in the aft direction upon release and removal of the retention plates 286. To release the plates 286, the overlying windage plates 287 are first removed and then pins 310 are removed rearwardly from the wheel 20, particularly through axial openings 289 in the outer rim of the aft disk 46. Upon removal of the pins 310, each retention plate is enabled for sliding movement in a circumferential direction away from its retained tube for radial alignment with the slot 294 through the radially outermost flange 290. Once aligned, retention plates 286 are withdrawn radially outwardly as illustrated by the arrows in FIG. 19. Because the retention plates are the sole means to prevent axial movement of the tubes in the aft direction, the tubes 56 and 58 may be withdrawn in an axial aft direction. The removal of the return tube 58 is illustrated in FIG. 20 and its direction of movement is indicated by the arrows. It will be appreciated that the spoolie 180 interconnecting the forward end of the return tube 58 and the return manifold RM is also removed with the axial withdrawal of return tube 58. If spoolie 180 becomes disconnected from the return tube 58, it can be removed through the aligned openings through the wheels and spacers located by the return tube 58.

Figure 22:
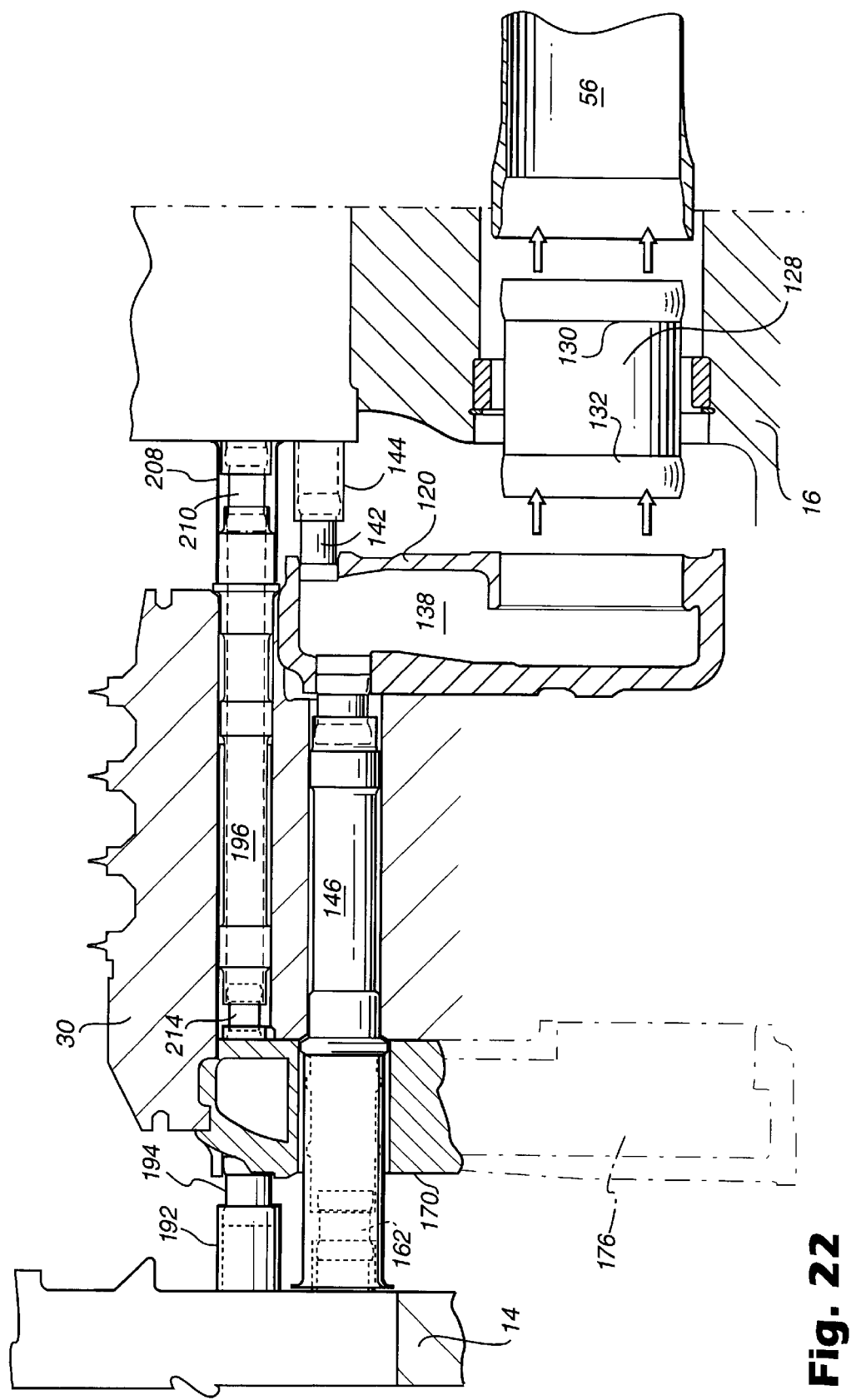
FIG. 22 is a view similar to FIG. 5 illustrating removal of the supply tube and spoolie in an aft direction.

Similarly, the axial supply tube 56 is withdrawn from the aligned openings of the wheels and spacers in an axially aft direction, as illustrated in FIG. 22. The spoolie at its forward end is likewise either withdrawn with the tube or may be withdrawn separately.

Figure 23:
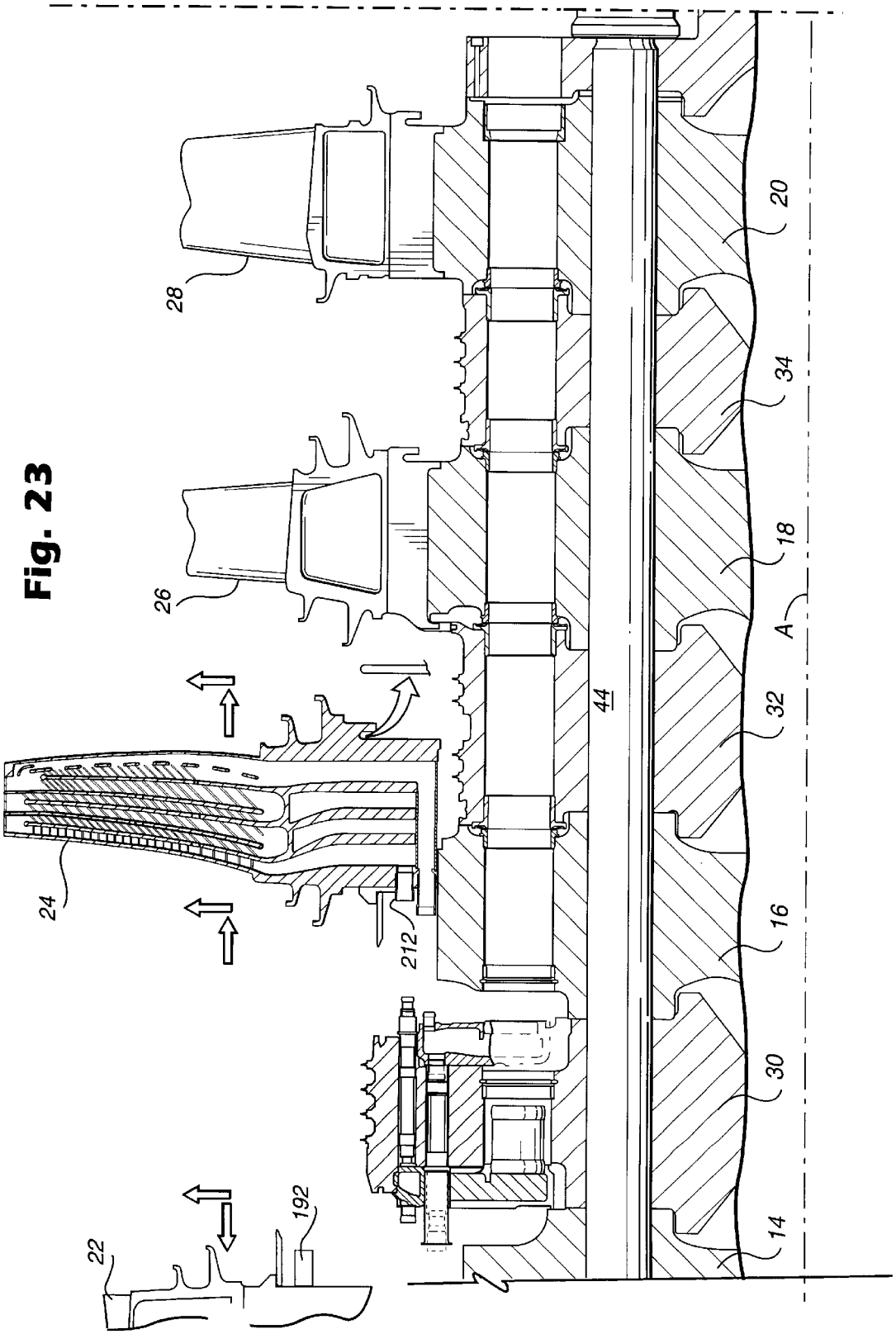
FIG. 23 is a view similar to FIG. 3A illustrating removal of the turbine buckets from the first and second-stage wheels.
Figure 24:
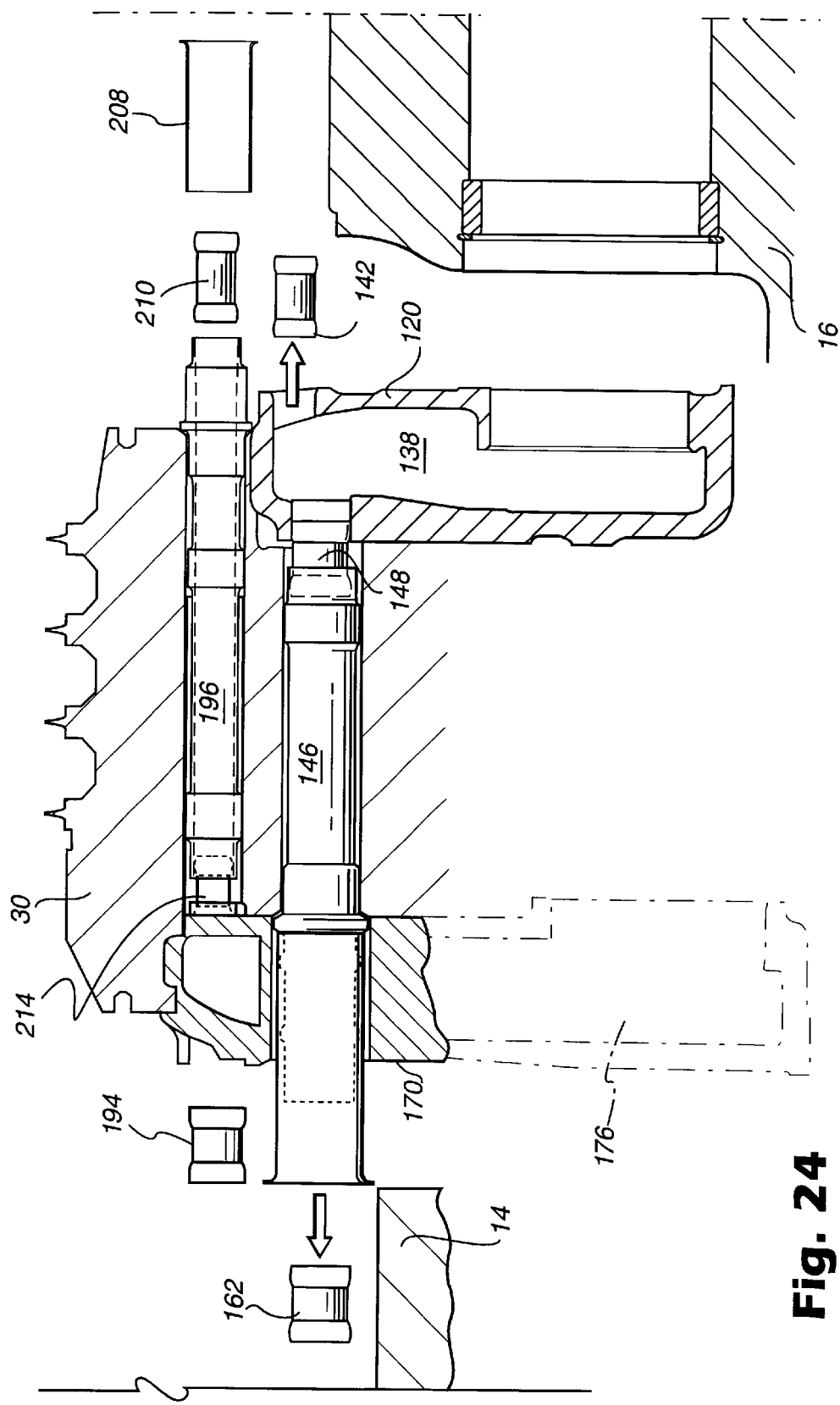
FIG. 24 is a view similar to FIG. 5 illustrating the removal of the forward and aft spoolies of the supply crossover tubes, respectively.
Figure 25:
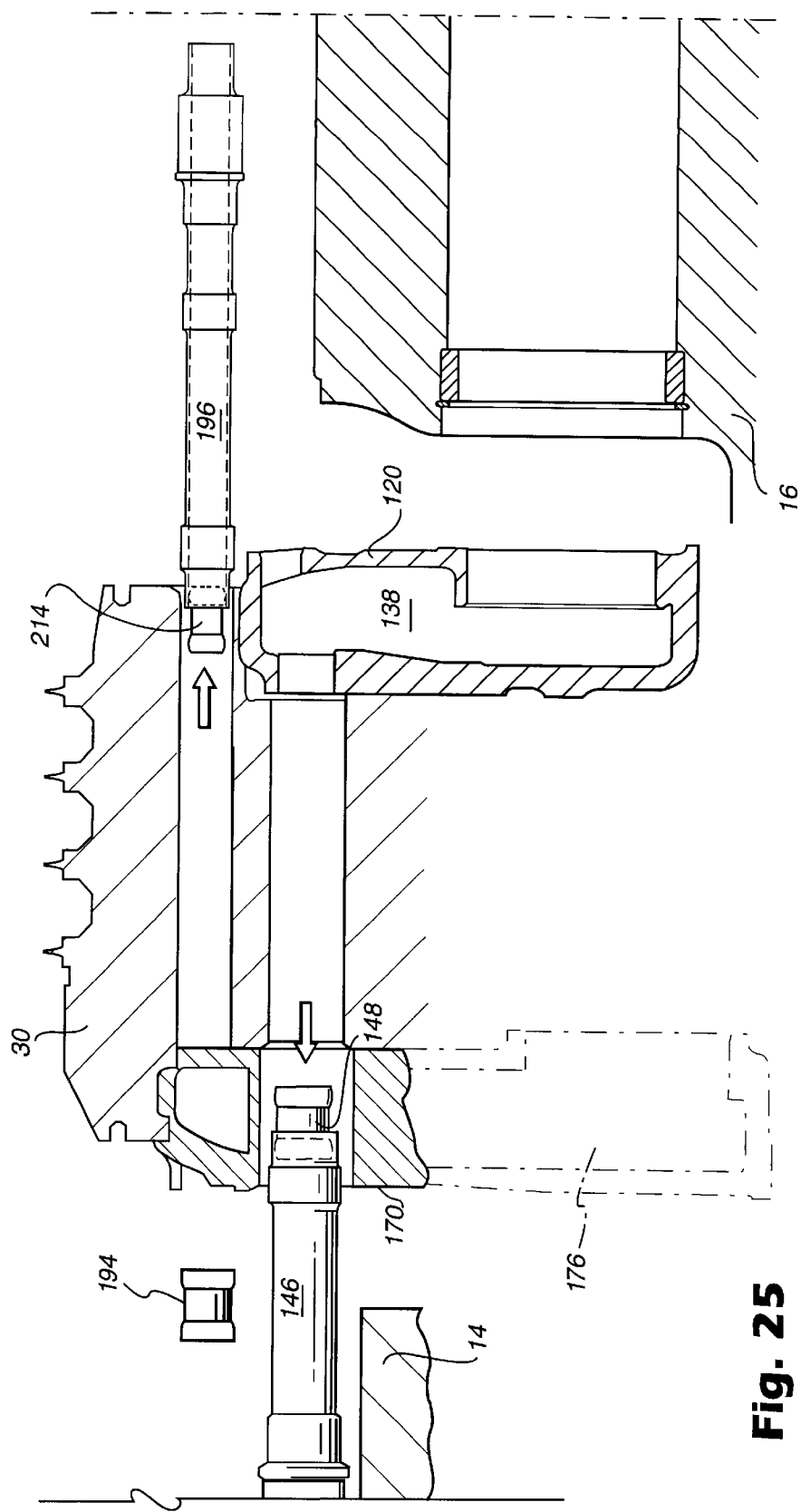
FIG. 25 is a view similar to FIG. 24 illustrating removal of the supply and return crossover tubes.
Figure 26:
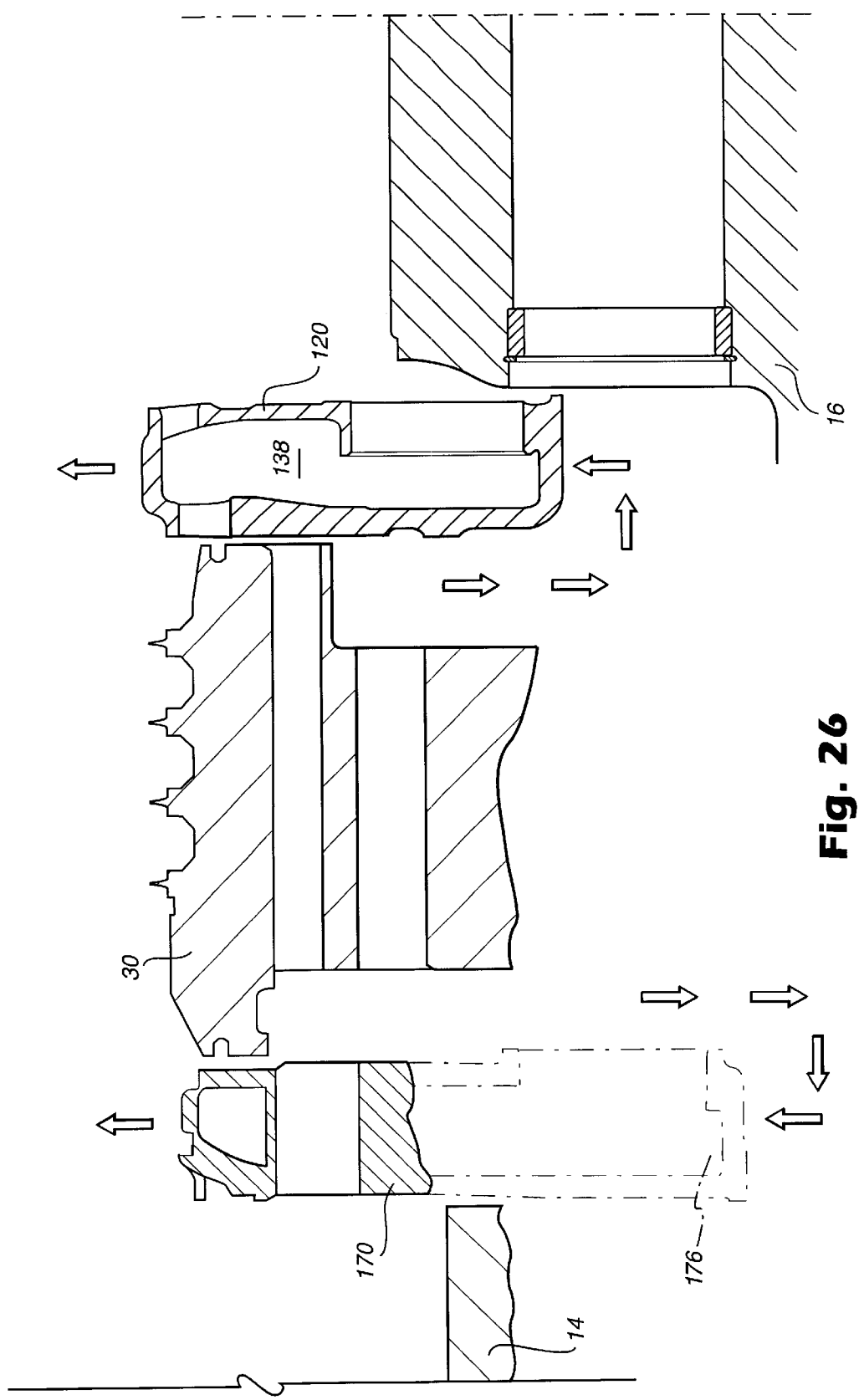
FIG. 26 is a view similar to FIG. 25 illustrating the removal of the manifold segments.

Referring now to FIG. 23, in order to remove the crossover tubes and manifolds, the buckets on the adjacent wheels, i.e., the buckets on the first and second-stage wheels 14 and 16, are removed. Retention wires, not shown, holding the buckets in the circumferential arrays thereof are first removed. This permits the buckets on the first-stage wheel to be displaced in an axially forward direction for removal and the buckets of the second-stage wheel for displacement in an axially aft direction for removal as indicated by the axial and radial directional arrows. Upon removing the buckets, the spoolies 142, 162, 210 and 194 connecting the buckets and manifolds are pulled axially with the buckets. Alternatively, those spoolies can be pulled out with the crossover tubes 146 and 196. After the spoolies are removed, the crossover tubes 146 and 196 are released for removal through respective opposite ends of the spacer. As illustrated in FIGS. 24 and 25, the crossover tubes 146 from the supply manifold to the first-stage buckets can be withdrawn in an axially forward direction as indicated by the arrow in FIG. 25. Similarly, the crossover tubes 196 can be displaced axially in an aft direction as illustrated in FIG. 25 into the space vacated by the removed buckets of the second wheel. The removal of the spoolies 56, 142, 148, 180, 194 and 214 also releases the manifold segments for removal. The manifold segments 120 and 170 are displaced radially inwardly a short distance to clear the overlying lip on the spacer. The manifold segments are then rotated circumferentially a short distance. The supply manifold segment 120 is then displaced axially so that it can be removed in a radial outward direction to clear the lip on the spacer 30 as indicated by the arrows in FIG. 26. Similarly, the return manifold segment 170 is displaced radially inwardly, circumferentially, axially forwardly and then radially outwardly to remove it from between the spacer 30 and first-stage wheel 14.

The bore tube assembly 48 can also be withdrawn from the aft shaft 106. It will also be recalled that the inner and outer tubes 84 and 82 defining the supply and return steam passages in the bore tube assembly are secured at their forward ends to the end cap 108. Further, the outer diameters of the outer tube 82 and the end cap 108 are less than the diameter of the aft shaft 106, enabling the bore tube assembly to be withdrawn axially in an aft direction. Referring to FIG. 3B, one of a plurality, preferably four, radially extending pins 300 extend through a reduced diameter portion of the aft disk 46. The radially inner ends of the radial pins 300 engage in blind holes or recesses formed in the outer peripheral surface of the end cap 108, the inner and outer bore tubes 82 and 84 being secured, preferably by welding, to the end of the end cap 108.

To retain the radial pins 300 in their bore tube engaging position, a like plurality of axially extending pins 302 are inserted through the aft disk, as illustrated in FIG. 3B. The axial pins 302 engage in semi-circular cutouts in the radial pin to retain the radial pins 300 in their positions engaged for the bore tube assembly.

To remove the bore tube assembly, therefore, the axial pins 302 are removed axially to release the radial pins for radial outward withdrawing movement. Access to the axial pins 302 is provided upon removal of the main bearing cover and ancillary parts. By withdrawing the radial pins 300 from the holes in the end cap and having previously withdrawn the radial steam supply and return tubes 54 and 60, respectively, the bore tube assembly may be withdrawn in an axial rearward direction along the aft shaft for repair and/or replacement.

From the foregoing, it will be appreciated that the various parts which comprise the steam path for steam cooling the turbine may be disassembled from the turbine and repaired or replaced as needed or at scheduled maintenance intervals. The assembly of these various steam parts into the turbine may proceed in the reverse order as explained above with respect to their disassembly.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of repairing one or more parts of a closed circuit system for cooling the buckets of a turbine rotor having axially spaced wheels mounting the buckets and spacers between said wheels, wherein the parts include a plurality of tubes disposed within the rotor and defining flow passages for flowing a cooling medium to and from the buckets, comprising the steps of:

removing at least one of said tubes from said rotor; and installing in said rotor said one tube repaired or a replacement part for said one tube.

2. A method according to claim 1 wherein said one tube extends axially within said rotor and including the steps of withdrawing said one tube in an axial direction and installing said one tube repaired or replacement part for said one tube in an axial direction.

3. A method according to claim 1 wherein said one tube extends radially within said rotor and including the steps of withdrawing said one tube in a radial direction and installing said one tube repaired or replacement part for said one tube in a radial direction.

4. A method of disassembling at least a portion of a cooling system for cooling buckets of a turbine rotor having axially spaced wheels mounting the buckets and spacers between said wheels, the cooling system having a plurality of parts including a plurality of generally axially extending tubes circumferentially spaced from one another about the rotor defining flow passages for flowing a cooling medium, a plurality of generally radially extending tubes defining flow passages for flowing the cooling medium, and an aft disk forming part of said rotor and having a plurality of flow turning elements interconnecting said axial and radially extending tubes, said flow turning elements having passageways for communicating and turning the cooling medium between the flow passages of said axial and radial tubes, comprising the steps of:

removing said flow turning elements from said aft disk;

removing said radial tubes from said aft disk in a radial outward direction; and removing said axial tubes in a generally aft direction.

5. A method according to claim 4 wherein said radial tubes are releasably coupled to said flow turning elements by connecting members and including, prior to removing said flow turning elements, disconnecting said flow turning elements from said radial tubes by disconnecting the connecting members from said flow turning elements.

6. A method according to claim 5, including after disconnecting said connecting members, displacing the radial tubes in a radial inward direction.

7. A method according to claim 6 including, after displacing the radial tubes in said radial inward direction, removing said radial tubes from said rotor in a radial outward direction.

8. A method according to claim 4 wherein the axial tubes are retained in the rotor against axial movement in an aft direction by retention parts, and the further steps of removing the retention parts to release the axial tubes for axial movement in the aft direction.

9. A method according to claim 8 wherein said retention parts include a pair of retention plates on opposite sides of each axial tube and includes the steps of displacing the plates generally in circumferential directions and subsequently in generally radial directions for removal from the rotor.

10. A method according to claim 4 wherein said rotor includes at least one manifold in communication with at least one of said axial tubes and with internal cooling passages in at least one of said buckets, and a spoolie interconnecting the one axial tube and the manifold including the step of removing the spoolie in an aft axial direction with the one axial tube or separately removing the spoolie in an aft axial direction after the one axial tube has been removed.

11. A method according to claim 4 wherein said rotor includes at least one manifold in communication with at least one of said axial tubes and with internal cooling passages in at least one bucket each of adjacent wheels of said rotor, said adjacent wheels being spaced axially from one another by a spacer, said spacer having a crossover tube for flowing cooling medium between said manifold and said one bucket of an adjacent wheel and including the steps of removing said one bucket of said adjacent wheel by displacing the one bucket in an axial direction for release from said adjacent wheel and removing said crossover tube from said spacer by displacing said crossover tube in an axial direction toward the adjacent wheel having the one bucket removed therefrom.

12. A method according to claim 4 wherein said rotor includes adjacent wheels mounting said buckets, said wheels being spaced axially from one another by a spacer, first and second manifolds on opposite sides of said spacer, said first manifold being connected to one of said axial tubes and having a first crossover tube extending through said spacer for flowing the cooling medium between said first manifold and at least one bucket of one of said wheels, said second manifold being connected to another of said axial tubes and having a second crossover tube extending through said spacer for flowing the cooling medium between said second manifold and at least one bucket on another of said wheels, including the steps of removing said buckets from said wheels and subsequently removing said crossover tubes from said spacer by displacing the crossover tubes in axial directions.

13. A method according to claim 4 wherein said rotor includes at least one manifold in communication with at least one of said axial tubes and with internal cooling passages in at least one of said buckets and including the step of removing the manifold from the rotor by axial displacement of the manifold relative to the rotor and withdrawing the one manifold in a generally radial outward direction from the rotor.

14. A method according to claim 13 wherein the step of removing the manifold includes displacing the manifold radially inwardly prior to axially displacing the manifold.

15. A method according to claim 4 including subsequent to disassembling of said at least a portion of said cooling system, including reinstalling said removed parts, including replacing one of said removed parts with a substantially identical replacement part.

16. A method according to claim 4 wherein said rotor includes an axial extending bore tube assembly for communicating the cooling medium between the radial tubes and a supply and including the step of removing the bore tube assembly from the rotor in an axial aft direction.

17. A method of repairing one or more of the parts of a cooling system for a turbine rotor having axially spaced wheels mounting buckets, and spacers between said wheels, said cooling system having a plurality of parts for flowing a cooling medium within the rotor to and from the buckets, comprising the steps of:

removing at least one of said cooling system parts from said rotor; and installing in said rotor said one cooling system part repaired or a replacement part for said one cooling system part.

\* \* \* \* \*